(12) United States Patent
Caruso et al.

(10) Patent No.: US 8,496,997 B2
(45) Date of Patent: Jul. 30, 2013

(54) PROCESS FOR THE PREPARATION OF A CROSS-LINKED MULTILAYER FILM

(75) Inventors: Francesco Caruso, Victoria (AU); Greg Guanghua Qiao, Victoria (AU); Anton Richard Blencowe, Victoria (AU); Tor Kit Goh, Victoria (AU); Luke Andrew Connal, Victoria (AU); Georgina Kate Such, Victoria (AU)

(73) Assignee: The University of Melbourne, Victoria (AU)

( * ) Notice: Subject to any disclaimer, the term of this patent is extended or adjusted under 35 U.S.C. 154(b) by 0 days.

(21) Appl. No.: 12/932,959

(22) Filed: Mar. 10, 2011

(65) Prior Publication Data

US 2011/0250353 A1    Oct. 13, 2011

Related U.S. Application Data

(60) Provisional application No. 61/312,346, filed on Mar. 10, 2010.

(51) Int. Cl.
*B05D 1/36* (2006.01)
*B05D 7/00* (2006.01)

(52) U.S. Cl.
USPC ........................................ 427/407.1; 427/402

(58) Field of Classification Search
USPC ................................. 427/454, 470, 492, 97.1
See application file for complete search history.

(56) References Cited

U.S. PATENT DOCUMENTS 3,578,728 A * 5/1971 Ehrhart et al. .................. 525/28
2009/0047517 A1 * 2/2009 Caruso et al. ............ 428/402.24

FOREIGN PATENT DOCUMENTS

WO    WO 2008/049108 A1    4/2008

OTHER PUBLICATIONS

Caruso et al. Australian Research Council Discovery Project Grant DP1094147 Feb. 2009.*
Australian Research Council (ARC) grant application, Mar. 11, 2009, pp. 1-71.

* cited by examiner

*Primary Examiner* — Timothy Meeks
*Assistant Examiner* — Michael P. Rodriguez
(74) *Attorney, Agent, or Firm* — RatnerPrestia

(57) ABSTRACT

The present invention provides a process for the preparation of a multilayer film, in particular, a cross-linked multilayer macromolecular film.

18 Claims, 10 Drawing Sheets
(8 of 10 Drawing Sheet(s) Filed in Color)

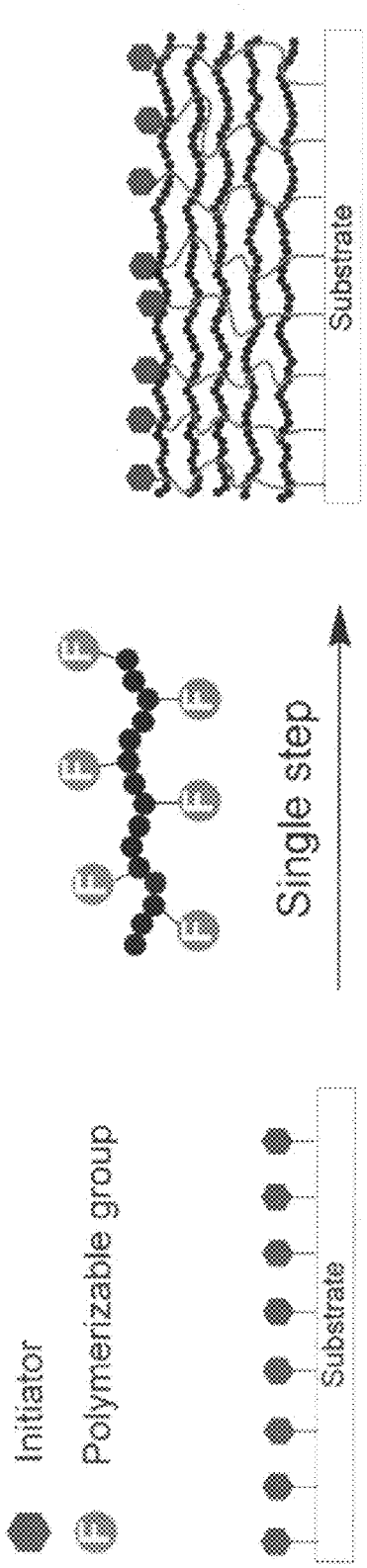
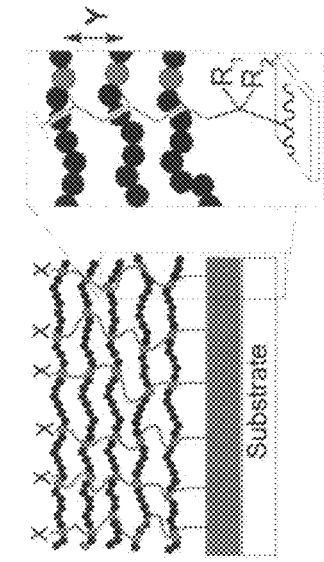
FIGURE 1
FIGURE 3

PROCESS FOR THE PREPARATION OF A CROSS-LINKED MULTILAYER FILM

This application claims priority to U.S. patent application No. 61/312,346 filed Mar. 10, 2010 which is incorporated herein by reference.

FIELD OF THE INVENTION

The present invention relates to a process for the preparation of a multilayer film, in particular, a cross-linked multilayer macromolecular film.

BACKGROUND

The fabrication of ultrathin films with polymer precursors has been the basis for many advancements in materials science and nanotechnology.

Over the last decade, nanotechnology research has widely exploited "bottom up" assembly methods to construct advanced functional materials of tailored chemical and physical properties. One "bottom up" technique is the layer-by-layer (LbL) assembly technique. This method entails the sequential assembly of components from solution onto surfaces based on interactions such as electrostatic or hydrogen bonding interactions. However, while the LbL assembly technique permits the nanoscale engineering of materials, the process can be labour and time consuming as it typically involves the individual deposition of alternating polymers with complementary functionalities to construct the polymer assembly so reaction times of several hours or days are required to create the films. Such films can also be susceptible to disassembly under varying solution conditions that disrupt the electrostatic or hydrogen bonds.

Other methods reported for the fabrication of thin films and nanostructures are surface grafting methods, such as "grafting from" and "grafting to" methods. The "grafting from" approach involves initiation of a surface with an initiating moiety, which is then used to initiate the polymerisation of monomers from the surface. The "grafting to" approach utilizes end-functionalised polymers, which are then coupled to a complementary functional group present on a surface. A disadvantage of films fabricated by these techniques however is that the films lack mechanical rigidity. Furthermore, the grafted films are not structurally persistent if the underlying substrate is removed.

It would be desirable to provide a new process for preparing covalently cross-linked multilayer macromolecular films.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each claim of this application.

SUMMARY

It has been found that cross-linked multilayer macromolecular films of controlled properties and dimensions can be fabricated using a continuous polymerisation method, which can enable the films to be conveniently prepared.

In one embodiment the present invention provides a process for the preparation of a cross-linked multilayer macromolecular film including the steps of:

(a) contacting a substrate having a surface and a plurality of initiating moieties on the surface with a macromolecule composition including a macromolecule having a plurality of polymerisable functional groups capable of reacting with the plurality of initiating moieties on the surface of the substrate;

(b) forming a plurality of cross-links between the surface of the substrate and the macromolecule to covalently attach a layer of the macromolecule to the surface and regeneration of a plurality of initiating moieties on an outer surface of the macromolecule layer;

(c) contacting the plurality of initiating moieties on the surface of the macromolecule layer with a macromolecule composition including a macromolecule having a plurality of polymerisable functional groups capable of reacting with the plurality of initiating moieties on the surface of the macromolecule layer; and (d) forming a plurality of cross-links between the surface of the macromolecule layer and the macromolecule to covalently attach a subsequent layer of the macromolecule to the surface and regeneration of a plurality of initiating moieties on an outer surface of the subsequently attached macromolecule layer.

In some embodiments of the process steps (c) and (d) are repeated one or more times to provide a cross-linked multilayer macromolecular film including a plurality of cross-linked macromolecule layers, wherein each subsequent macromolecule layer is covalently attached to the surface of the macromolecule layer underlying it.

In some embodiments of the process each cross-link between a surface and a macromolecule is formed by directly reacting an initiating moiety on the surface with a polymerisable functional group of the macromolecule.

In some embodiments of the process the macromolecule composition includes a spacer compound adapted to react with an initiating moiety on a surface, and wherein each cross-link between a surface and a macromolecule is formed by reacting the spacer compound with an initiating moiety on the surface and a polymerisable functional group of the macromolecule.

In some embodiments of the process steps (a), (b), (c) and (d) are carried out concurrently in a single reaction vessel.

In some embodiments of the process a subsequently attached layer of the multilayer macromolecular film includes a plurality of reactive functional groups on an outer surface and wherein the process further includes the step of reacting at least one of the plurality of reactive functional groups with an initiating compound to generate at least one initiating moiety on the surface of the subsequently attached layer, wherein the initiating moiety generated on the surface is capable of reacting with a polymerisable functional groups of a macromolecule. In such embodiments, steps (c) and (d) may be repeated one or more times to covalently attach a further stratum of cross-linked macromolecule layers to the subsequently attached layer.

In some embodiments of the process each initiating moiety is adapted to initiate a controlled polymerisation reaction.

In some embodiments of the process at least one initiating moiety is adapted to initiate a ring opening polymerisation reaction.

In some embodiments of the process at least one initiating moiety is adapted to initiate a ring opening metathesis polymerisation (ROMP) reaction. In such embodiments the initiating moiety preferably includes a metal. The metal is preferably selected from the group consisting of ruthenium, molybdenum, titanium, tungsten, osmium and iron.

In some embodiments of the process at least one initiating moiety is adapted to initiate a radical polymerisation reaction.

In some embodiments of the process at least one initiating moiety is adapted to initiate an atom transfer radical polymerisation (ATRP) reaction. In such embodiments the initiating moiety preferably includes an alkyl halide moiety. The alkyl halide moiety may be selected from the group consisting of haloalkane, halo(alkyl)aryl, haloketone, haloester, haloamide and halonitrile.

In some embodiments of the process at least one initiating moiety is adapted to initiate a reversible addition fragmentation chain transfer (RAFT) reaction.

In some embodiments of the process at least one initiating moiety is adapted to initiate nitroxide-mediated polymerisation (NMP) reaction.

In some embodiments of the process the macromolecule composition is a solution.

In some embodiments of the process the macromolecule composition is an aqueous solution.

In some embodiments of the process the substrate is dipped into the solution to contact the surface of the substrate with the macromolecule composition.

In some embodiments of the process the macromolecule composition is sprayed onto the surface of the substrate to contact the surface with the macromolecule composition.

In some embodiments of the process the macromolecule composition includes at least one macromolecule selected from the group consisting of synthetic polymers, natural polymers and synthetically modified analogues of natural polymers.

In some embodiments of the process each layer of the multilayer macromolecule film includes a macromolecule of the same type.

In some embodiments of the process the substrate includes a material selected from the group consisting of silica-based materials (e.g. glass, silica, silicon, quartz), polymeric materials (e.g. polyolefins, polyesters), geopolymers (e.g. concretes, clays) carbon-based materials (e.g. carbon fiber), metals (e.g. gold, iron, aluminium), alloys and quantum dots.

In some embodiments of the process the substrate is a template particle and wherein the multilayer macromolecular film is formed around the particle.

In some embodiments of the process the substrate is removable.

In some embodiments the process may further include the step of modifying the multilayer macromolecular film by reacting at least one reactive functional group on a layer of the macromolecular film with a compound selected from the group consisting of antifouling agents, superhydrophobic agents, antimicrobials, chelating compounds, fluorescent compounds, antibodies, scavenging compounds, metals and physiologically active compounds.

BRIEF DESCRIPTION OF THE FIGURES

The patent or application file contains at least one drawing executed in color. Copies of this patent application publication with color drawings will be provided by the Office upon request and payment of the necessary fee.

FIG. 1 is a scheme illustrating general process for forming a cross-linked multilayer macromolecular film in accordance with embodiments of the invention.

FIG. 3 is a scheme illustrating a process for the preparation of a cross-linked multilayer film using a metal-catalysed living polymerisation reaction in accordance with one embodiment of the invention.

DETAILED DESCRIPTION

Figure 2:
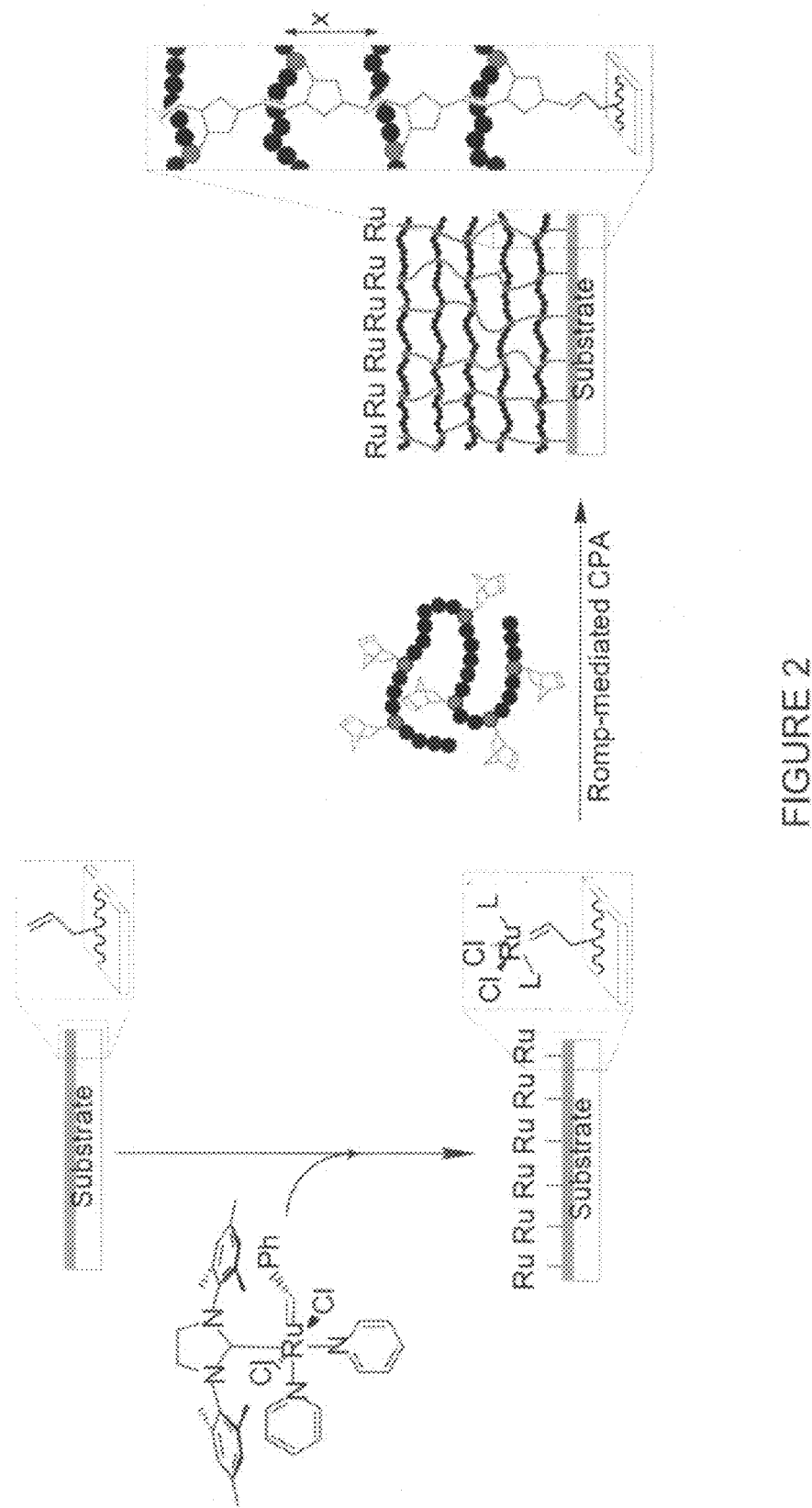
FIG. 2 is a scheme illustrating a process for the preparation of a cross-linked multilayer film using a ROMP reaction in accordance with one embodiment of the invention.

Various terms that will be used throughout the specification have meanings that will be well understood by a skilled addressee. However, for ease of reference some of these terms will now be defined.

As used herein, the term "macromolecule" refers to a polymeric molecule of molecular weight of at least 500 Daltons (Da). Macromolecules may be homopolymers or copolymers. A number of macromolecules are known in the art. Macromolecules that may be used in the invention include synthetic polymers, natural polymers including bio-macromolecules such as polypeptides, polysaccharides and polynucleotides and the like, as well as synthetically modified analogues of natural polymers.

As used herein the term "outer surface" when used in connection with a macromolecule layer refers to an exposed surface of a macromolecule layer.

As used herein reference to a percentage of a component in a reaction mixture or composition refers to the percentage by weight unless otherwise specified.

The process of the invention provides a facile approach for generating cross-linked multilayer macromolecular films. A benefit of the process is that it enables multilayer macromolecular films of desired thickness to be prepared in a controllable and continuous manner. In one embodiment, film fabrication can advantageously to be carried out in a one-pot procedure.

The process of the invention further enables multilayer films of diverse composition and nanostructure to be prepared, however with greater ease than with conventional layer-by-layer techniques.

Substrate

The process of the invention involves the step of (a) contacting a substrate having a surface and a plurality of initiating moieties on the surface with a macromolecule composition including a macromolecule having a plurality of polymerisable functional groups capable of reacting with the plurality of initiating moieties on the surface of the substrate Any substrate having a suitable surface may be used in the process. In one embodiment, the substrate has a planar surface. As used herein "planar" refers to a surface that is substantially flat, having variations of less than about 10 microns, more preferably less than about 5 microns from planar. In another embodiment, the substrate has a non-planar surface. As used herein, "non-planar" refers to a surface that varies by at least 5 microns, more preferably at least 10 microns and even more preferably at least 20 microns from planar. In one embodiment, the non-planar surface may be a curved surface. In one embodiment the substrate may be a template particle providing a curved surface defined by the surface of the particle. It is preferred that the template particle is spherical or substantially spherical. Examples of template particles include colloidal particles, nanoparticles, microspheres, crystals, and the like. Template particles used in the process of the invention may be of any size. In some embodiments, the template particle has a diameter that is no more than about 1 mm, no more than about 500 μm, no more than about 100 μm, no more than about 50 μm, no more than about 10 μm, no more than about 1 μm and no more than about 500 nm. In some embodiments it is desirable that the template particle has a diameter in the nm range.

In one embodiment the substrate may be porous. An example of a porous substrate is a porous template particle. The porous substrate may be of any suitable type that provides an interconnected network of pores. The pores may take a number of different shapes and sizes however it is preferred that the porous template is a mesoporous template. Mesoporous templates are templates in which there are at least some pores, preferably a majority of pores having a pore size in the range 2 to 50 nm. In some embodiments of the invention the porous template particle is spherical or substantially spherical.

The substrate may include a suitable material. In some embodiments, the substrate includes a material selected from the group consisting of silica-based materials (e.g. glass, silica, silicon, quartz), polymeric materials (e.g. polyolefins, polyesters), geopolymers (e.g. concretes, clays) carbon-based materials (e.g. carbon fiber), metals (e.g. gold, iron, aluminium), alloys and quantum dots.

In one embodiment, the substrate is removable. In this regard, the substrate may be removed by exposing the substrate to appropriate conditions that destroy the substrate but do not adversely affect the macromolecules used in the preparation of the multilayer macromolecular film. In one embodiment, the substrate is removed by exposure to hydrofluoric acid. The hydrofluoric acid may have a concentration from 0.01 to 10 M, more preferably from 1 to 10 M, most preferably about 5 M. The substrate may also be removed by disrupting covalent bonding interactions between the substrate and the macromolecules used in the preparation of the multilayer film, and thereafter liberating the substrate from the assembled multilayer macromolecular film.

The substrate employed in the process of the invention includes a plurality of initiating moieties on a surface. In this regard, the substrate includes two or more initiating moieties on a surface. The plurality of initiating moieties are typically located on an outer surface of the substrate. For porous substrates having an internal porous structure, an outer surface could include the surface of the pores.

In one embodiment, the plurality of initiating moieties may be provided by the substrate material. Thus no modification of the substrate is required to form initiating moieties. In another embodiment, the substrate is modified to provide initiating moieties on a surface.

In one embodiment, modification of the substrate may involve reacting a surface of the substrate with an initiating compound that provides a plurality of initiating moieties.

In one embodiment of the invention the substrate may include a material having functional groups. As an example, substrate materials such as silica and polyethyleneimine include hydroxy and amine functional groups, respectively. Modification of the substrate may therefore involve reaction of the hydroxy or amine functional groups of the substrate material with an initiating compound to provide a plurality of initiating moieties on the surface of the substrate. In one embodiment, the substrate is a template particle having functional groups.

In another embodiment of the invention, modification of the substrate may involve modifying the surface of the substrate to provide a plurality of functional groups then reaction of the functional groups with an initiating compound to provide a plurality of initiating moieties. As an example, a silica substrate may be modified with allyltriethoxysilane to provide allyl functional groups on the surface of the substrate. The allyl functional groups may then be reacted with an initiating compound having an appropriate functionality to provide initiating moieties that are immobilized on the surface of the substrate.

In another embodiment, modification of the substrate may involve coating the surface of the substrate with a coating material having a plurality of functional groups and reaction of the functional groups of the coating material with an initiating compound to provide a plurality of initiating moieties. As an example, a substrate may be modified with a coating material including azide or alkyne functional groups. The coating material may be reacted with an initiating compound that contains a complementary functional group (e.g. alkyne or azide functional group) to couple the initiating compound to the coating material by a 'click chemistry' reaction. The coupled initiating compound therefore provides an initiating moiety that is immobilized on the surface of the substrate.

In some embodiments the density of the plurality of initiating moieties on the surface of the substrate is an amount in the range of between about 1% to 99%, based on the surface area of the substrate. In some embodiments, the density of initiating moieties on the surface may in the range of between about 3% to 80%, based on the surface area of the substrate.

In some embodiments, the plurality of initiating moieties may be arranged in a pre-determined pattern so that film growth can be directed in a pre-determined manner as dictated by the pattern. A pattern of initiating moieties may be generated on a surface of a substrate by the use of techniques such as micro-contact printing, lithography, dip-pen lithography and ink-jet printing of precursor compounds or macromolecules bearing initiator moieties.

Initiating Moiety

The plurality of initiating moieties are adapted to initiate a controlled polymerisation reaction. Examples of controlled polymerisation reactions include controlled ring-opening polymerisation reactions, radical polymerisation reactions, including controlled or 'living' free radical polymerisation reactions, controlled or 'living' ionic polymerisation reactions and catalyst-transfer polycondensation reactions.

The initiating moieties employed in the process of the invention may be selected from a range of moieties that are suitable for initiating polymerisation reactions. A person skilled in the relevant art would understand that initiation of a polymerisation reaction may occur by a number of mechanisms, including chemical, thermal and photolytic mechanisms. The process of the invention may, in principle, allow the polymerisation reaction to be initiated by any one of, or a combination of, mechanisms by the appropriate selection of initiating moieties that will operate under the desired conditions for the desired polymerisation reaction.

In some embodiments of the process of the invention at least one of the plurality of initiating moieties is adapted to initiate a ring-opening polymerisation reaction. A suitable initiating moiety may include a functional group capable of initiating the ring-opening polymerisation reaction. Examples of functional groups that may initiate ring-opening polymerisation include hydroxy, amine, alkyl halide, alkyl tosylate, alkyl triflate, diaryl iodinium and aryl diazonium functional groups. In some embodiments of the process of the invention at least one of the plurality of initiating moieties is adapted to initiate a ring-opening metathesis polymerisation (ROMP) reaction. An initiating moiety adapted to initiate a ring-opening metathesis polymerisation (ROMP) reaction may include a metal. In some embodiments an initiating moiety may include a metal selected from the group consisting of ruthenium, molybdenum, titanium, tungsten, osmium and iron. In some embodiments the metal is a late transition metal. In some embodiments an initiating moiety may be formed from an initiating compound selected from a Grubbs' catalyst or Schrock catalyst. A Grubbs' catalyst may include an acid-activated catalyst system, where its metathesis activity is activated by UV. A general structure of some initiating compounds that may be used to provide an initiating moiety adapted to initiate a ROMP reaction is shown in Formula (I), Formula (II) and Formula (III) below.

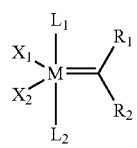

(I)

where:
(a) M is a metal, preferably selected from Ru, Mo, Ti, W, Os and Fe;
(b) $R_1$ and $R_2$ are each independently selected from the group consisting of H, $C_{2-20}$ alkenyl, $C_{2-20}$ alkynyl, $C_{1-20}$ alkyl, aryl, $C_{1-20}$ carboxylate, $C_{1-20}$ alkoxy, $C_{2-20}$ alkenyloxy, $C_{2-20}$ alkynyloxy, aryloxy, $C_{2-20}$ alkoxycarbonyl, $C_{1-20}$ alkylthio, $C_{1-20}$ alkylsulfonyl and $C_{1-20}$ alkylsulfinyl;
(c) $X_1$ and $X_2$ each represent an anionic ligand; and
(d) $L_1$ and $L_2$ each represent a neutral electron donor.

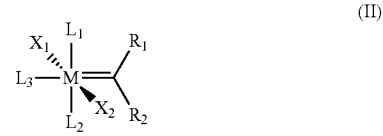

(II)

where:
(a) M is a metal, such as ruthenium or osmium;
(b) $X_1$ and $X_2$ may be the same or different and are each independently an anionic ligand;
(c) $L_1$, $L_2$ and $L_3$ may be the same or different and are each independently a neutral electron donor ligand, optionally further including one or more functional groups such as hydroxyl, thiol, thioether, ketone, aldehyde, ester, ether, amine, imine, amide, nitro, carboxylic acid, disulfide, carbonate, isocyanate, carbodiimide, carboalkoxy, carbamate, halogen, alcohol, sulfonic acid, phosphine, imide, acetal, ketal, boronate, cyano, cyanohydrin, hydrazine, enamine, sulfone, sulfide, and sulfenyl; and
(d) R and $R_1$ are each independently hydrogen or a substituent selected from the group consisting of $C_1$-$C_{20}$ alkyl, $C_2$-$C_{20}$ alkenyl, $C_2$-$C_{20}$ alkynyl, aryl, $C_1$-$C_{20}$ carboxylate, $C_1$-$C_{20}$ alkoxy, $C_2$-$C_{20}$ alkenyloxy, $C_2$-$C_{20}$ alkynyloxy, aryloxy, C2-C20 alkoxycarbonyl, $C_1$-$C_{20}$ alkylthio, $C_1$-$C_{20}$ alkylsulfonyl and $C_1$-$C_{20}$ alkylsulfinyl and silyl. Optionally, each of the R or $R_1$ substituent group may be substituted with one or more moieties selected from the group consisting of $C_1$-$C_{10}$ alkyl, $C_1$-$C_{10}$ alkoxy, and aryl which in turn may each be further substituted with one or more groups selected from a halogen, a $C_1$-$C_5$ alkyl, $C_1$-$C_5$ alkoxy, and phenyl.

In certain embodiments, at least one of $L_1$, $L_2$ and $L_3$ is an N-heterocyclic carbene ligand.

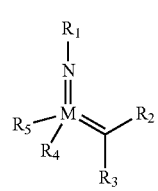

(III)

where:
(a) M is a metal, preferably selected from Ru, Mo, Ti, W, Os and Fe;
(b) $R_1$ is selected from the group consisting of unsubstituted or substituted aryl, unsubstituted or substituted heteroaryl, unsubstituted or substituted alkyl, and unsubstituted or substituted heteroalkyl;
(c) $R_2$ and $R_3$ are each independently selected from the group consisting of H, unsubstituted or substituted alkyl, unsubstituted or substituted heteroalkyl, unsubstituted or substituted aryl and unsubstituted or substituted heteroaryl;
(d) $R_4$ and $R_5$ may be the same or different and are each independently selected from the group consisting of unsubstituted or substituted alkyl, unsubstituted or substituted heteroalkyl, unsubstituted or substituted aryl and unsubstituted or substituted heteroaryl.

Some examples of metal containing catalysts that may suitable for use as initiating compounds are described in WO 9729135, WO 2003011455, WO 2002076613, WO 2002079126, US 2003069374 and WO 2002014376 and EP 218138.

Some specific examples of initiating compounds that may be used to provide an initiating moiety adapted to initiate a ROMP reaction are shown below.

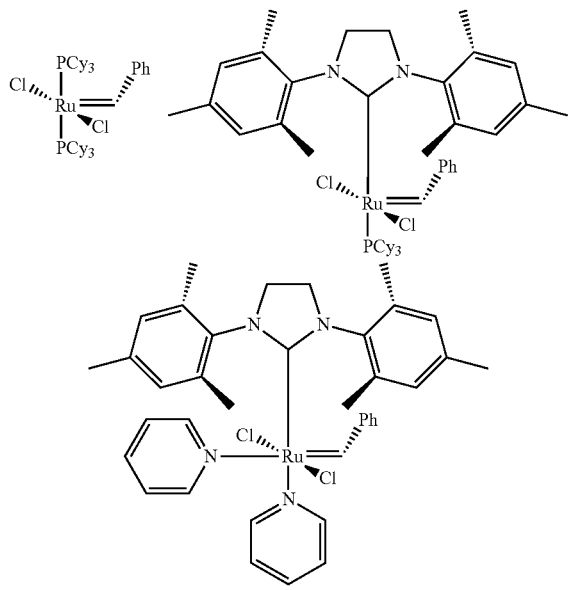

In some embodiments, initiating moieties derived from initiating compounds of Formula (I), (II) or (III) as described above may exhibit enhanced activity and stereoselectivity. In some embodiments, the initiating moiety may include a stereogenic metal atom. Such initiating moieties may be useful in enantioselective catalysis.

In some embodiments of the process of the invention at least one of the plurality of initiating moieties is adapted to initiate a metal-catalyzed living radical polymerisation reaction, such as a atom transfer radical polymerisation (ATRP) reaction. Initiating moieties that can be used to initiate a metal-catalyzed living radical polymerisation reaction may include an alkyl halide or a sulfonyl halide moiety.

Specific examples of alkyl halide moieties include haloalkane, halo(alkyl)aryl, haloketone, haloester, haloamide and halonitrile moieties. The alkyl portion of the alkyl halide moiety may include any suitable number of carbon atoms. In one embodiment, the alkyl portion includes 1 to 20 carbon atoms, preferably 1 to 10 carbon atoms. The alkyl portion may also be a saturated or unsaturated linear or branched carbon group. The halo portion of the alkyl halide moiety may include a halogen atom selected from the group consisting of F, Cl, Br and I.

A general structure of an initiating compound that may be used to provide an initiating moiety adapted to initiate a metal-catalyzed living radical polymerisation reaction is shown in Formula (IV) below.

(IV)

where
(a) $R_1$ is selected from the group consisting of H, $C_1$-$C_{20}$ alkyl and $C_5$-$C_{20}$ aryl;

(b) $R_2$ is selected from the group consisting of H and $C_1$-$C_{20}$ alkyl;
(c) X is a halide, preferably selected from the group consisting of F, Cl, Br and I; and
(d) Y is selected from the group consisting of $C_1$-$C_{20}$ alkyl, $C_5$-$C_{20}$ aryl, —OC=O, —$NR_3$CO and CN, where $R_3$ is selected from H and $C_1$-$C_4$ alkyl.

In some embodiments of the process of the invention the initiating moiety is adapted to initiate a reversible addition fragmentation chain transfer (RAFT) reaction. General structures of some initiating compounds that may be used to provide an initiating moiety adapted to initiate a RAFT reaction are shown below.

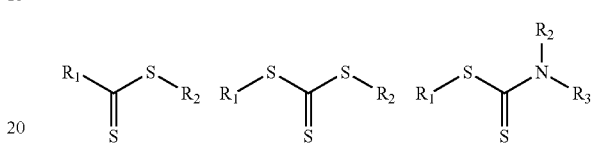

where in each of the above structures:
the groups $R_1$, $R_2$ and $R_3$ may each be independently selected from $C_1$-$C_{20}$ alkyl and $C_5$-$C_{20}$ aryl.

In some embodiments of the process of the invention the initiating moiety is adapted to initiate a nitroxide mediated polymerisation (NMP) reaction. A general structure of an initiating compound that may be used to provide an initiating moiety adapted to initiate a NMP reaction is shown in Formula (V).

(V)

where $R_1$, $R_2$ and $R_3$ are each independently selected from $C_1$-$C_{20}$ alkyl and $C_5$-$C_{20}$ aryl.

In some embodiments of the process of the invention the initiating moiety is adapted to initiate cationic polymerisation reactions. General structures of some initiating compounds that may be used to provide an initiating moiety adapted to initiate a cationic polymerisation reaction are shown below.

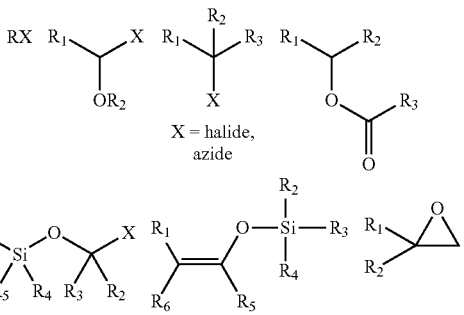

where in each of the above structures:
the groups $R_1$, $R_2$, $R_3$, $R_4$, $R_5$ and $R_6$ may each be independently selected from $C_1$-$C_{20}$ alkyl and $C_5$-$C_{20}$ aryl; and
X represents an azide or a halide preferably selected from the group consisting of F, Cl, Br, I.

In some embodiments of the process of the invention the initiating moiety is adapted to initiate an anionic polymerisation reaction. General structures of some initiating compounds that may be used to provide an initiating moiety adapted to initiate an anionic polymerisation reaction are shown below.

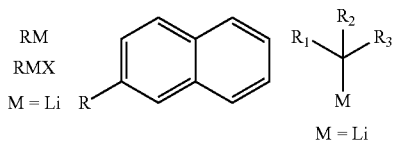

where in each of the above structures:
R is selected from $C_1$-$C_{20}$ alkyl and $C_5$-$C_{20}$ aryl;
M is a metal, preferably Mg and Li; and
X is a halide, preferably selected from the group consisting of F, Cl, Br and I.

In some embodiments of the process of the invention the initiating moiety is adapted to initiate a catalytic transfer polycondensation reaction. General structures of some initiating compounds that may be used to provide an initiating moiety adapted to initiate a catalytic transfer polycondensation reaction are shown below.

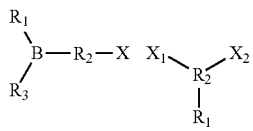

where in each of the above structures:
$R_1$, and $R_3$ are each independently selected from the group consisting of $C_1$-$C_{20}$ alkyl and $C_5$-$C_{20}$ aryl;
$R_2$ represents $C_5$-$C_{20}$ aryl; and
X represents a halide, preferably selected from the group consisting of F, Cl, Br and I.

In some embodiments of the invention an initiating moiety or a polymerisable function group of a macromolecule may be activated for initiation by a catalyst. For example, the functional groups used to initiate ring-opening polymerisation may be activated for initiation by a catalyst such as tin, aluminium or scandium-centred catalysts, N-heterocylic carbenes, Lewis acids or bases, quaternary ammonium compounds and cationic or anionic compounds. In another example, the alkyl halide moiety used to initiate an ATRP reaction may be activated by a catalyst including a metal such as a copper, such as Cu(I), Cu(II), ruthenium (Ru), nickel (Ni), or iron (Fe). A person skilled in the relevant art would be able to select an appropriate catalyst to activate a selected initiating moiety or polymerisable functional group of a macromolecule.

Macromolecule Composition

The process of the invention employs a macromolecule composition. The macromolecule composition includes a macromolecule having a polymerisable functional group capable of reacting with an initiating moiety.

The macromolecule composition may include one or more macromolecules as described below. Typically, the macromolecule composition includes the macromolecule mixed with a carrier. In some embodiments the carrier is a solvent. The solvent may be an organic solvent or an aqueous solvent. In some embodiments the solvent is water. The choice of carrier may be dependent on the controlled polymerisation method selected to prepare the multilayer macromolecular film, together with the choice of macromolecule, substrate and/or initiating moiety. It is an advantage of the invention that the process can be performed under a range of conditions and is not limited to the use of organic solvent, as is the case for many other methods for forming macromolecular films. In addition, the ability to use an aqueous solvent means that film preparation can be carried out at various pH.

The macromolecule composition may include one or more macromolecules in any suitable concentration. In some embodiments, the composition may have a concentration of the macromolecules selected from the group consisting of from about 0.001 to 1000 mg mL$^{-1}$, of from about 0.1 to 30 mg mL$^{-1}$ and of from about 0.5 to 10 mg mL$^{-1}$.

In some embodiments the macromolecule composition may optionally include a spacer compound, as described below. When used, the spacer compound may be present at a concentration in the range of from about 0.001 to 1000 mg mL$^{-1}$.

In some embodiments the macromolecule composition may be a solution in which the macromolecule is dissolved in the carrier. The solution may be a homogeneous, single-phase solution. In other embodiments the macromolecule composition may be an emulsion or dispersion in which the macromolecule is suspended or dispersed in the carrier. In some embodiments of the invention the composition can also include a surfactant or other conventional additive or excipient.

In accordance with the process of the invention a surface of a substrate is contacted with a macromolecule composition. Contacting of the macromolecule composition with the substrate allows a macromolecule in the composition to be brought into proximity to the surface of the substrate. The macromolecule composition may contact the substrate using any suitable technique. Examples of possible techniques include dip coating, roller coating, brush coating, spraying and other methods known in the art. Dip coating may be a convenient and effective method of contacting the substrate with a macromolecule composition. Dip coating involves the immersion of the substrate in the macromolecule composition. This technique may result in a layer of the macromolecule composition being formed on the surface.

In embodiments of the process the substrate is dipped into a macromolecule composition to contact a surface of the substrate with the macromolecule composition in step (a).

In embodiments of the process a macromolecule composition is sprayed onto a surface of a substrate to contact the surface with the macromolecule composition in step (a).

Macromolecules

A range of suitable macromolecules may be used in the macromolecule composition. The inventors have found that the process is not limited to use with a particular type of macromolecule, but can be generally used with a broad range of macromolecules. Examples of macromolecules that may be used include synthetic polymers, natural polymers and synthetically modified analogues of natural polymers.

Macromolecules used in the process of the invention may be of any composition, including homopolymers and copolymer such as random copolymers and block copolymers.

Macromolecules used in the process of the invention may further be of any architecture, including linear, graft, brush, hyperbranched, star, branched or dendritic architecture. The macromolecules may also include one or more chiral centres and have a helical or stereospecific structure.

Examples of synthetic polymers include but are not limited to polyethers such as polyethylene glycol, ester containing polymers such as poly(acrylates) and poly(methacrylates), polyolefins such as poly(ethylene) and poly(propylene), alcohol containing polymers such as poly(vinyl alcohol), amide containing polymers such as poly(acrylamides), poly(methacrylamides) and poly(N-alkylacrylamide) or poly(N-arylacrylamide), acid containing polymers such as poly(acrylic acid) and poly(methacrylic acid), graft polymers such as poly(methyl methacrylate)-graft-poly(ethylene glycol) and conjugated polymers such as polyanilines, polyacetylenes, polythiophenes, polyfluorenes and polyphenylenes. Examples of natural polymers include but are not limited to peptides, glycopeptides, peptidoglycans, glycosaminoglycans, glycolipids, lipopolysaccharides, proteins, glycoproteins, polypeptides, polysaccharides, polycarbohydrates such as cellulose, dextrans, alginates, amyloses, pectins, glycogens, and chitins; polynucleotides such as DNA, RNA and oligonucleotides. Examples of synthetically modified analogues of natural polymers include but are not limited to synthetically modified biopolymers such as carboxymethyl cellulose, carboxymethyl dextran and lignin sulfonates; polysilanes, polysilanols, poly phosphazenes, polysulfazenes, polysulfide and polyphosphate and mixtures thereof. A person skilled in the relevant art would be able to select an appropriate macromolecule suitable for an intended application. In some embodiments, the macromolecule does not include polydopamine.

In some embodiments the macromolecule is a biocompatible macromolecule. A biocompatible macromolecule is typically one that is substantially non-toxic to biological systems. Such biocompatible macromolecules can generate appropriate beneficial tissue or cellular responses without substantial adverse or undesirable local or systemic effects in the physiological environment. In some embodiments the macromolecule is a biodegradable macromolecule. A biodegradable macromolecule is typically one that is capable of undergoing chemical breakdown in a biological, physiological or environmental system. Some specific examples of biocompatible and/or biodegradable macromolecules include chitosan and poly(lactide).

In some embodiments the macromolecules may include a moiety that provides tailored properties to the resulting multilayer macromolecular film. For example, the macromolecules may include a cleavable moiety that is adapted to undergo selective degradation under pre-determined conditions to provide a degradable film. The cleavable moiety may be any suitable moiety that undergoes selective degradation. In some embodiments, the cleavable moiety degrades under hydrolytic, thermal, enzymatic, proteolytic, oxidizing, reducing or photolytic conditions. In some embodiments, the cleavable moiety is selected from the group consisting of a disulfide, an ester, an amide, an alkene, an acetal, a sulfate, a phosphate and a photocleavable link. The degradation of the cleavable moiety provides a convenient route for the selective disassembly of the multilayer macromolecular film under controlled conditions.

The macromolecule composition may include one type of macromolecule, or it may include a mixture of two or more different types of macromolecules. A mixture of macromolecules may include a mixture of two or more macromolecules of different class, for example, a mixture of a natural polymer and a synthetic polymer. Alternatively, a mixture of macromolecules may include a mixture of two or more different types of macromolecules of the same class, for example, or a mixture of two or more different types of synthetic polymer. Mixtures of macromolecules may be desirable to tailor or control the properties of the multilayer macromolecular film. For example, in drug delivery applications it may be desirable to provide a multilayer molecular film that exhibits a controllable rate of biodegradation. The use of a mixture of two or more macromolecules that have different rates of degradation may enable the overall rate of film degradability to thereby be adjusted and controlled.

Macromolecules used in the process of the invention may be of any suitable size or molecular weight. In some embodiments, a macromolecule may have a molecular weight selected from the group consisting of at least 500 Da, at least 1000 Da, at least 10,000 Da, at least 100,000 Da and at least 1,000,000 Da.

Macromolecules employed in the process of the invention include a plurality of polymerisable functional groups. Thus, macromolecules used in the process of the invention include two or more polymerisable functional groups. Each polymerisable functional group is capable of reacting with an initiating moiety on a surface. Often, the polymerisable functional groups are pendant groups of the macromolecule. The nature of each polymerisable functional group may vary, depending on the nature of the initiating moiety and the polymerisation method selected to assemble the multilayer macromolecular film. A range of different types of polymerisable functional groups may be employed and a person skilled in the relevant art would be able to select an appropriate polymerisable group depending on the intended application.

A desired polymerisable functional group may be incorporated in the macromolecule by appropriate selection of the monomers used to synthesize a macromolecule, or by modification of a macromolecule to introduce the required functional group. In some embodiments the plurality of polymerisable functional groups is present in an amount of from about 0.01 to 99% of the macromolecule.

In some embodiments it is desirable that the polymerisable functional groups are distributed across the macromolecule backbone, either in an even or random fashion. This is in comparison to block copolymers, where a concentration of polymerisable functional groups may exist in one area (i.e. one block) of the copolymer.

Where ring-opening polymerisation (ROP) is used to prepare the multilayer macromolecular film, the macromolecule may include at least one polymerisable functional group adapted to participate in ring-opening reactions. Functional groups adapted to participate in ring-opening reactions require a cyclic moiety. Examples of cyclic moieties include cyclic esters such as caprolactone, cyclic carbonates, cyclic amides such as caprolactam, cyclic siloxanes, cyclic ethers such as epoxides, cyclic oxazolines, cyclic amines such as aziridine and N-carboxy anhydrides.

Where ROMP is used to prepare the multilayer macromolecular film, the macromolecule may include at least one polymerisable functional group adapted to participate in ROMP reactions. Functional groups adapted to participate in ROMP reactions may have a strained cyclic moiety. An example of a strained cyclic moiety is a cyclic ring having one or more unsaturated bonds, such as a cycloalkene. Cycloalkenes may include one ring system or two or more fused ring systems, where at least one of the rings includes at least one unsaturated bond. In some embodiments the macromolecule may include a functional group selected from the group consisting of C3 to C8 monocyclic-alkenes and C6 to C20 bicyclic-alkenes. Some specific examples of monocyclic-alkenes include cyclobutene, cyclopentene, cyclohexene and cyclobutene methyl ester while an example of a bicyclic-alkene is norbornene.

Where a controlled free radical polymerisation method such as ATRP, NMP or RAFT is used to prepare the multilayer macromolecular film, the macromolecule may include at least one polymerisable functional group adapted to participate in free radical polymerisation reactions. Polymerisable functional groups adapted to participate in free radical polymerisation reactions may include an (meth)acrylate moiety, a styrenic moiety or a vinyl moiety. (Meth)acrylate, styrenic and vinyl moieties may be incorporated in a macromolecule by post-polymerization modification. As an example, poly(hydroxyl ethyl acrylate) with pendant hydroxyl groups on each repeat unit can be esterified with a compound bearing a polymerisable moiety to form a macromolecule with pendant polymerisable functional groups. Alternatively, a macromolecule bearing a plurality of polymerisable functional groups may be prepared from appropriate monomers capable of providing the polymerisable functional groups, provided that the polymerisable functional groups are unreactive under the synthetic conditions used to prepare the macromolecule.

Where an ionic polymerisation method such as cationic or anionic polymerisation is used to prepare the multilayer molecular film, the macromolecule may include at least one polymerisable functional group adapted to participate in ionic polymerisation reactions. Examples of suitable functional groups adapted to participate in ionic polymerisation reactions include vinyl functional groups such as (meth)acrylates, styrenes, olefins, acrylonitrile and vinyl ethers (cationic polymerisation only).

Where a catalytic transfer polycondensation reaction is used to prepare the multilayer molecular film, the macromolecule may include at least one polymerisable functional, group adapted to participate in catalytic transfer polycondensation reaction. Examples of suitable functional groups adapted to participate in catalytic transfer polycondensation reactions include aryl halides having a central aromatic group such as thiophene, alkyl thiophene, phenyl, alkyl phenyl, fluorene, alkyl fluorene and silafluorene.

The macromolecule employed in the invention includes a plurality of polymerisable functional groups. The plurality of polymerisable functional groups may each be of the same type of functional group, or they may be a mixture of two or more different types of functional groups. For example, the macromolecule may include a polymerisable functional group having a cyclic moiety and a polymerisable functional group having a vinyl moiety. Mixtures of different types of functional groups may be desired where two or more different types of controlled polymerisation methods employed in the preparation of the multilayer macromolecular film. For example, the cyclic moiety is capable of participating in a ring-opening polymerisation reaction, while the vinyl moiety is capable of participating in a controlled free radical polymerisation reaction. This use of a mixture of different types of polymerisable functional groups may provide additional level of control over the assembly and/or nanostructure of the multilayer macromolecular film.

Where a macromolecule composition includes a mixture of two or more macromolecules, the selection of polymerisable functional group can affect a macromolecules' reactivity and hence determine the compositional structure and properties of the resulting multilayer film.

A difference in polymerisable functional group reactivity may be used to prepare multilayer macromolecular films having macromolecular layers of alternating or gradient composition. For example, alternating ROMP can be achieved using a macromolecule composition including two different macromolecules, where macromolecule A has one type of polymerisable functional group (e.g. cyclobutene methyl ester) and macromolecule B has another type of polymerisable functional group (e.g. cyclohexene). This provides a means of achieving alternating $(AB)_n$ layering of macromolecules in the multilayer film via a one-pot procedure. Alternatively, macromolecule A may have a high reactivity polymerisable functional group, such as a high reactivity cyclic monomer (e.g. cyclobutene) and macromolecule B may have a low reactivity polymerisable functional group such as a low reactivity cyclic monomer (e.g. cyclohexene). This provides a means of achieving a gradient (A-to-B) multilayer film via a one-pot procedure. In another example, alternating ATRP can be achieved using a macromolecule composition including two different macromolecules, where macromolecule A has one type of polymerisable functional group (e.g. styrene) and macromolecule B has another type of polymerisable functional group (e.g. methyl methacrylate). This provides a means of achieving alternating $(AB)_n$ layering of macromolecules in the multilayer film in a one-pot procedure. Alternatively, macromolecule A may have a high reactivity polymerisable functional group (e.g. methyl methacrylate) and macromolecule B may have a low reactivity polymerisable functional group (e.g. methyl acrylate). This provides a means of achieving a gradient (A-to-B) multilayer film via a one-pot system procedure.

Spacer Compound

In some embodiments of the invention the macromolecule composition may include a spacer compound. The spacer compound is typically a molecule of relatively low molecular weight. Examples of spacer compounds that may be present in the macromolecule composition include monomer compounds and low molecular weight oligomers, such as oligopeptides, oligosaccharides, oligonucleotides and the like. The oligomers typically include one or more polymerisable functional groups, such as those described herein. The molecular weight of the spacer compound is preferably not more than about 500 Da, more preferably not more than about 200 Da.

In some embodiments of the invention, the spacer compound may also include a moiety that provides tailored properties to the resulting multilayer macromolecular film. For example, the spacer compound may include a cleavable moiety, which is adapted to undergo selective degradation under pre-determined conditions. The cleavable moiety may be any suitable moiety that undergoes selective degradation. In some embodiments, the cleavable moiety degrades under hydrolytic, thermal, enzymatic, proteolytic, oxidizing, reducing or photolytic conditions. In some embodiments, the cleavable moiety is selected from the group consisting of a disulfide, an ester, an amide, an alkene, an acetal, a sulfate, a phosphate and a photocleavable link.

The macromolecule composition may include one spacer compound, or it may include two or more spacer compounds in a mixture with the macromolecule.

The spacer compound is adapted to react with an initiating moiety on a surface. Upon reaction with an initiating moiety, the spacer compound is covalently attached to the surface and an initiating moiety is regenerated on the spacer compound. The spacer compound thereby propagates an initiating moiety from the surface. The regenerated initiating moiety on the spacer compound is then capable of reacting with a polymerisable functional group of a macromolecule. The spacer compound may include appropriate functional groups that allow it to react with an initiating moiety on a surface. In some embodiments, the spacer compound includes a polymerisable functional group, such as those described herein for the macromolecule. Preferably the polymerisable functional group of a spacer compound is the same as that of the macromolecule with which it has been mixed, so that the reactions of the polymerisable functional groups of the spacer compound and the macromolecule each proceed by the same pathway.

Multilayer Macromolecular Film Formation

The process of the invention includes the step of: (b) forming a plurality of cross-links between the surface of the substrate and the macromolecule to covalently attach a layer of the macromolecule to the surface and regeneration of a plurality of initiating moieties on an outer surface of the macromolecule layer. The macromolecule layer attached to the surface may in some embodiments be regarded as a first formed macromolecule layer.

The process of the invention allows a plurality of initiating moieties to be regenerated on the outer surface of the first formed macromolecule layer. The regenerated initiating moieties are capable of participating in covalent bonding reactions to deposit and attach another layer of macromolecule to the first formed layer. Subsequent deposition and attachment of one or more further macromolecule layers on top of the first formed macromolecule layer then provides a cross-linked multilayer macromolecular film. In each instance, following attachment of a subsequent macromolecule layer a plurality of initiating moieties are regenerated on a surface of the subsequently attached layer. The regenerated initiating moieties propagate the controlled polymerisation reaction and allows in situ assembly and continuous growth of the multilayer film by permitting the build up of successive layers of macromolecule until the polymerisation reaction is stopped. In this matter, the invention enables continuous polymer assembly (CPA) or the continuous assembly of polymer (CAP) to occur. In the present specification, where the terms "continuous polymer assembly", "continuous assembly of polymer", "CPA" and "CAP" are used, it is to be understood that the terms are used interchangeably.

Accordingly, the process of the invention also includes the steps of:

(c) contacting the plurality of initiating moieties on the surface of the macromolecule layer with a macromolecule composition including a macromolecule having a plurality of polymerisable functional groups capable of reacting with the plurality of initiating moieties on the surface of the macromolecule layer; and (d) forming a plurality of cross-links between the surface of the macromolecule layer and the macromolecule to covalently attach a subsequent layer of the macromolecule to the surface and regeneration of a plurality of initiating moieties on an outer surface of the subsequently attached macromolecule layer.

A general example of the concept of forming a cross-linked multilayer macromolecular film in accordance with embodiments of the invention is illustrated in FIG. 1. As illustrated in FIG. 1, a surface of a substrate includes a plurality of initiating moieties. The substrate and initiating moieties are brought into contact with a macromolecule including a plurality of polymerisable functional groups. The process of the invention firstly forms a plurality of cross-links between the surface of a substrate and a macromolecule to covalently attach a layer of the macromolecule to the surface. Initiating moieties are regenerated on an outer surface of the attached macromolecule layer. The process then further forms a plurality of cross-links between an outer surface of the macromolecule layer and a macromolecule to covalently attach a subsequent layer of the macromolecule. Initiating moieties are also regenerated on an outer surface of the subsequently attached macromolecule layer.

As used herein, the term "outer surface" refers to an exposed surface of a macromolecule layer. An "outer surface" may be the exposed surface of a top-most layer of the multilayer macromolecular film. A person skilled in the relevant art would appreciate however that when a cross-link is formed between an initiating moiety on an outer surface of a macromolecule layer and a polymerisable functional group of a macromolecule to covalently attach a subsequent layer of macromolecule, the said 'outer surface' then becomes an inner surface within the multilayer structure and a new "outer surface" is generated from the subsequently attached macromolecule layer.

In some embodiments steps (c) and (d) are repeated one or more times to provide a cross-linked multilayer macromolecular film including a plurality of cross-linked macromolecule layers, wherein each subsequently formed macromolecule layer is covalently attached to the surface of the macromolecule layer underlying it. In this way, the process of the invention allows multiple macromolecule layers to be assembled and cross-linked in a continuous manner.

The multilayer macromolecular film may include any number of macromolecule layers. In one embodiment, the film includes at least two macromolecule layers. The multilayer film may include up to any maximum number of macromolecule layers, and the maximum number of layers may in part be dictated by the end use application of the film. Theoretically, there is no upper limit to the number of macromolecule layers in the multilayer film provided sufficient quantities of macromolecule and initiating moieties are available to allow continued film formation. For some practical purposes however, the film may include from between two and twelve macromolecule layers.

The growth of the macromolecule layers, including the thickness of the layers, may be monitored using any suitable technique. Examples of suitable techniques include UV-vis, IR and fluorescence spectroscopy, ellipsometry, atomic force microscopy and flow cytometry.

In some embodiments cross-link formation between a macromolecule and a surface (i.e either the surface of a substrate or an outer surface of a macromolecule layer) can occur by directly reacting the initiating moieties on the respective surface with the polymerisable functional groups of the macromolecule. In this regard, the direct reaction between the initiating moieties and the polymerisable functional groups leads to the formation of multiple covalent bonds between the surface and the macromolecule.

In other embodiments, cross-link formation between a macromolecule and a surface (i.e either the surface of a substrate or an outer surface of a macromolecule layer) can occur by reacting a spacer compound that is present in the macromolecule composition with an initiating moiety on the respective surface and with a polymerisable functional group of the macromolecule. The spacer compound therefore forms part of a cross-link connecting the layer of macromolecule with the surface. In this way, the spacer compound may function to space apart the attached macromolecule layer and the surface underlying it. The spacer compound may also impart different functional or compositional properties to the multilayer macromolecular film.

In embodiments of the process, in reacting the spacer compound with an initiating moiety on a surface and a polymerisable functional group of the macromolecule, the spacer compound may firstly, react with the initiating moiety and be covalently attached to the surface prior to reacting with the macromolecule. In this embodiment, the initiating moiety is regenerated on the spacer compound for further reaction with the polymerisable functional group of the macromolecule.

In some embodiments, each of the plurality of cross-links in the multilayer macromolecular film is formed by directly reacting an initiating moiety on a surface (i.e either the surface of a substrate or an outer surface of a macromolecule layer) with a polymerisable functional group of the macromolecule.

In some embodiments, each of the plurality of cross-links in the multilayer macromolecular film is formed by indirectly reacting an initiating moiety on a surface (i.e either the surface of a substrate or an outer surface of a macromolecule layer) with a polymerisable functional group of the macromolecule via a spacer compound.

In some embodiments of the invention, a portion of the plurality of cross-links in the multilayer macromolecular film are formed by directly reacting an initiating moiety on a surface (i.e either the surface of a substrate or an outer surface of a macromolecule layer) with a polymerisable functional group of the macromolecule while another portion of the plurality of cross-links are formed by indirectly reacting an initiating moiety on a surface (i.e either the surface of a substrate or an outer surface of a macromolecule layer) with a polymerisable functional group of the macromolecule via a spacer compound.

In one embodiment of the invention, steps (a), (b), (c) and (d) are carried out concurrently in a single reaction vessel. Accordingly, in one embodiment the process of the invention provides a one-pot procedure for the fabrication of the multilayer macromolecular films.

One advantage of the invention is that continuous assembly and attachment of each subsequent layer of macromolecule can occur in situ in the presence of the macromolecule composition.

In one embodiment a cross-linked multilayer macromolecular film is formed by submerging a substrate having a plurality of initiating moieties on its surface in a macromolecule composition as described herein, then allowing a cross-linked film to form on the substrate under appropriately selected conditions. The continuous deposition and attachment of multiple layers of macromolecule on the substrate occurs in situ in the macromolecule composition in which the substrate has been submerged to yield the cross-linked multilayer film.

For example, where a surface of a substrate is brought into contact with a macromolecule composition by dip-coating, steps (b), (c) and (d) are performed while the substrate remains immersed in the composition so that assembly of the multilayer film occurs in situ in the presence of the macromolecule composition. Accordingly, in such embodiments, the substrate surface of step (a) and the macromolecule layer surface of step (c) are exposed to the same macromolecule composition.

A benefit of the process of the invention therefore, is elimination of the need to isolate or purify the film between each layer deposition step, as would be required for many conventional layer-by-layer (LbL) fabrication techniques. This means that the process of the invention allows the multilayer macromolecular film to be prepared in much less time and is less labour intensive compared to conventional LbL techniques.

A further benefit of the process of the invention is that covalent bond-forming reactions are confined to a surface due to the initiating moieties responsible for propagating the controlled polymerisation reaction being located at a surface. That is, the inventors have found that the process of the invention does not suffer from undesirable side reactions occurring in the bulk macromolecule composition.

The process of the invention can be used with a wide range of controlled polymerisation techniques. The ability to use different controlled polymerisation techniques will depend on the selection of an appropriate initiating moiety and polymerisable functional group of a macromolecule. Examples of initiating moieties and polymerisable functional groups that may be used with different controlled polymerisation techniques are described herein.

The contacting of a surface (i.e either the surface of a substrate or an outer surface of a macromolecule layer) with a macromolecule composition may be allowed to proceed for any suitable length of time. Generally, longer contacting times will lead to the deposition and attachment of more macromolecule layers. In some embodiments the contacting is carried out for a time period of between about 1 minutes to 25 hours, more preferably the contacting is carried out for a time period of between about 2 minutes hours to 20 hours, most preferably the contacting is carried out for a time period of between about 5 minutes to 12 hours.

The contacting of a surface (i.e either the surface of a substrate or an outer surface of a macromolecule layer) with a macromolecule composition may also be carried out under any suitable conditions. A person skilled in the relevant art would understand that the conditions employed will largely depend on the controlled polymerisation reaction conditions selected to prepare the multilayer macromolecular films and the nature of the initiating moieties and the polymerisable functional groups of the macromolecule. Reaction conditions for carrying out various controlled polymerisation techniques would be known to one skilled in the relevant art, or can be ascertained by reference to reference documents and books such as *Handbook of Metathesis* by Grubbs, R. H. (Ed.), Wiley: N.Y., 2003, *The Chemistry of Radical Polymerization* by Moad, G.; Solomon, D. H. ($2^{nd}$ Ed.), Elsevier: Oxford, 2006, *Handbook of Ring-Opening Polymerization* by Dubois, P.; Coulembier, O.; Raquez, J.-M. (Eds.), Wiley-VCH; Weinheim, 2009, 50 *Years of Living Polymerization* by Matyjaszewski, K; Müller, A. H. E. (Eds.) in *Progress in Polymer Science*, 2007, 32, page 1-282, the disclosures of which are incorporated herein by reference.

To illustrate the invention, embodiments of the process are described below with reference to a ring-opening metathesis polymerisation (ROMP) technique and a metal-catalysed living polymerisation technique.

Fabrication of Cross-Linked Multilayer Macromolecular Film Using ROMP:

An example of a process for preparing a cross-linked multilayer film using a ROMP reaction is shown in FIG. 2. As illustrated in FIG. 2, an alkene substrate is reacted with a ruthenium (Ru) catalyst to provide a Ru catalyst-functionalized substrate. The Ru catalysts provide initiating moieties on the surface of the substrate. The functionalized substrate is contacted with a macromolecule, such as poly((2-hydroxyethyl)acrylate-co-(2-(5-norboren-2-oxy)ethyl acrylate)), which includes pendant norbornene groups as polymerisable functional groups. The Ru containing initiating moieties react with the pendant norbornenes to ring-open the norbornenes to form cyclopentane groups and an alkene groups. The reaction between the Ru containing initiating moieties and the polymer result in covalent attachment of the polymer to the substrate as a macromolecule layer. As a result of the reaction, the Ru containing moieties are transported to the surface of the newly formed macromolecule layer and thus the initiating moieties are regenerated on an outer surface of the attached macromolecule layer. The regenerated Ru containing initiating moieties are then available to react with pendant norbornenes of another polymer molecule to covalently attach a subsequent layer of the polymer and thereby form a cross-linked multilayer macromolecular film.

One advantage of ROMP methodology is that the polymerisation process has low sensitivity to oxygen, water and impurities. This means that ROMP mediated by Grubbs-type catalysts can be performed without stringent reaction conditions or elaborate equipment. The initiating moiety used in the process is also tolerant to the presence of other functional groups. Additionally, the inventors have found that multilayer macromolecular films prepared with the methodology can be fabricated quite rapidly as a result of the high activity of the initiating moieties used in the process and the strained conformation of the cyclic functional groups present on the macromolecules used in this method. The rate of film formation may only be limited by the speed of macromolecule diffusion to the initiating moieties and hence it is possible to achieve film fabrication in a matter of minutes.

Fabrication of Cross-Linked Multilayer Macromolecular Film Using a Metal-Catalysed Living Polymerisation Reaction:

An example of a process for preparing a cross-linked multilayer film using a metal-catalysed living polymerisation reaction such as an ATRP reaction is shown in FIG. 3.

As illustrated in FIG. 3, an alkyl halide-functionalized substrate provides initiating moieties through which metal-catalyzed living radical polymerization can be initiated. This substrate, when contacted with a macromolecule having pendant polymerisable functional groups in the presence of an appropriate metal catalyst, can undergo a continuous assembly of polymers on the surface of the substrate. For copper-catalyzed ATRP, Cu(I) and an amine-based ligand are typically used. For ARGET ATRP, Cu(II), an amine-based ligand and a reducing agent (e.g. sodium ascorbate) are typically used. The polymerisable functional groups are typically (meth)acrylates, styrenes or vinyls. In the presence of the copper-ligand complexes, abstraction of the halide from an initiating moiety leads to free radical formation, where the radical can then react with the polymerisable functional groups of the macromolecule. The macromolecule is then covalently attached to the surface via these covalent bonds and the radicals are transferred to the newly formed surface. The radicals can be reversibly capped with halides and thus, the interchange between the radical (active) and alkyl halide (dormant) species is an equilibrium reaction. The radical (active) species enables continuous covalent attachment of macromolecular layers to the surface, thereby forming a cross-linked multilayer macromolecular film.

In some embodiments, the structure of a regenerated initiating moiety may be identical to the initiating moiety preceding it. Thus for example, the regenerated initiating moiety of step (b) may be identical in structure to the initiating moiety provided on the surface of the substrate. In turn, the regenerated initiating moiety of step (d) may be identical in structure to the initiating moiety produced in step (b) on the surface of the macromolecule layer. With the attachment of each subsequent macromolecule layer, the regenerated initiating moiety substantially retains its original structure.

In some embodiments of the process of the invention, the structure of a regenerated initiating moiety may not be identical to the initiating moiety preceding it.

In some embodiments of the process of the invention, the regeneration efficiency of an initiating moiety is selected from the group consisting of at least about 1%, at least about 5%, at least about 10%, at least about 20%, at least about 35%, at least about 50%, at least about 75% and at least about 90%. That is, at least about 1%, at least about 5%, a least about 10%, at least about 20%, at least about 35%, at least about 50%, at least about 75% or at least about 90% of the plurality of initiating moieties on a surface are regenerated in a subsequent regeneration step. For some types of initiating moieties, the regeneration efficiency of the moiety is substantially high and therefore a significantly constant number of initiating moieties are retained each time initiating moieties are regenerated on a surface of a macromolecule layer. In other instances however, the regeneration efficiency of an initiator moiety is not as high. Accordingly, the number of initiating moieties may decrease with each regeneration step.

In some embodiments, the continuous deposition and attachment of the macromolecule layers is allowed to proceed until a desired thickness of the multilayer macromolecular film is obtained. A desired thickness may be selected from the group consisting of at least 10 nm, at least 20 nm, at least 30 nm, at least 40 nm and at least 50 nm. One advantage of the process of the invention is that the desired film thickness may be achieved rapidly and in a relatively short time (in one embodiment in the matter of minutes), compared to conventional LbL techniques where such thicknesses can only be achieved in a time period of several hours to days.

Once a desired thickness is obtained, the process of the invention may be voluntarily stopped by addition of a terminating agent that is capable of preventing or inhibiting the growth and covalent attachment of subsequent layers of macromolecule. In one embodiment the terminating agent inactivates or removes one or more of the initiating moieties on an outer surface of a macromolecule layer. The inactivation or removal of initiating moieties prevents or inhibits the attachment of a subsequent layer of macromolecule. In another embodiment the terminating agent reacts with a polymerisable functional group of a macromolecule to render the macromolecule incapable of forming a cross-link with a surface. In other embodiments the process of the invention may be voluntarily stopped by removing the substrate carrying the multilayer macromolecular film from the macromolecule composition, thereby removing any initiating moieties from contact with the macromolecule composition.

An example of a terminating agent is the compound ethyl vinyl ether (EVE). EVE reacts with the Ru containing initiating moiety used in a ROMP reaction to displace the Ru containing moiety from the surface of a macromolecule layer. A terminal alkene functional group is then formed on the surface of the macromolecule layer.

In some embodiments, continuous assembly of the macromolecule layers may proceed until the macromolecule composition is substantially depleted of macromolecule. As steps (c) and (d) of the process are repeated, the quantity of macromolecule in the macromolecule composition is reduced. Accordingly, the formation of the multilayer film stops or slows down due to an insufficient quantity of macromolecule being available to form subsequent layers of the film. If desired, the macromolecule composition may be supplemented by additional amounts of macromolecule to allow the process and assembly of the multilayer film to continue. Optionally, a spacer compound may be added to the macromolecule composition if a variation of film composition or nanostructure is required.

In some embodiments, continuous assembly of the macromolecule layers may proceed until the initiating moieties are exhausted. Exhaustion of the initiating moieties can occur if the initiating moieties are rendered inactive, for example due to degradation of the initiating moiety, or if insufficient quantities of initiating moiety are regenerated on a surface.

Re-Initiation of Multilayer Macromolecular Film Formation

Where the assembly of the multilayer macromolecular film has stopped or slowed down, the process of the invention can also provide for the assembly of the film to be re-initiated so that fabrication of the film can be continued.

In some embodiments of the process of the invention, a layer of the multilayer macromolecular film may include a plurality of reactive functional groups on an outer surface. The reactive functional groups are each capable of reacting with an initiating compound to generate an initiating moiety on the surface of the layer. The resulting generated initiating moiety is capable of re-initiating a controlled polymerisation process, and may be selected from any one of the initiating moieties described herein. In embodiments of the invention a plurality of initiating moieties are generated as a plurality of reactive functional groups each react with an initiating compound. In this manner, an outer surface of a layer of the multilayer film is re-functionalised with a plurality of initiating moieties that allow the deposition and attachment of a subsequent layer of macromolecule to the multilayer macromolecular film and regeneration of a plurality of initiating moieties on the subsequently attached macromolecule layer, so that film growth can be re-started. The re-initiation of film growth enables the formation of a subsequent stratum of macromolecular layers. The generated initiating moieties may have the same structure, or a different structure, as the initiating moieties used to prepare a first stratum of macromolecule layers of the multilayer macromolecular film.

In some embodiments the density of the plurality of initiating moieties generated on the surface of the substrate is an amount in the range of between about 1% to 99%, based on the surface area of the substrate. In some embodiments, the density of initiating moieties generated on the surface may in the range of between about 3% to 80%, based on the surface area of the substrate.

In one embodiment at least one of the plurality of reactive functional groups on an outer surface of a layer may be introduced to the surface of the layer as a reaction product of the controlled polymerisation process. In another embodiment at least one of the plurality of reactive functional groups may be provided by a functional moiety that has been incorporated into the macromolecule used to form the layer. In another embodiment at least one of the plurality of reactive functional groups may be introduced to the surface of the layer by a terminating agent, which has been used to stop or inhibit film fabrication.

The layer of the multilayer macromolecular film may have any suitable type of reactive functional group. Additionally, any suitable initiating compound may be used. In some embodiments the reactive functional group and the initiating compound react with one another to generate a plurality of initiating moieties on the surface of the layer. In such embodiments the nature of the reactive functional group and the initiating compound will largely be dictated by the structure of the initiating moieties that are desired to be formed.

In some embodiments, an outer surface of a layer of the multilayer macromolecular film may include at least one reactive functional group selected from the group consisting of alkene, vinyl, hydroxy, amino, thiol, halide, azide, alkyne, isocyanate, epoxide, thioisocyanate, carbonate and sulfonyl halides.

In embodiments of the process of the invention the generated initiating moieties are adapted to initiate a ring-opening metathesis polymerisation (ROMP) reaction. Initiating moieties adapted to initiate a ROMP reaction are described herein. To provide an initiating moiety adapted to initiate a ROMP reaction, the initiating compound may be a Grubbs' catalyst or Schrock catalyst, which can react with reactive functional groups such as alkene groups on an outer surface of a layer to immobilize the catalyst on the surface and to provide appropriate initiating moieties on the layer. Examples of appropriate initiating compounds are described herein.

In some of the process of the invention the generated initiating moiety is adapted to initiate a metal-catalysed living polymerisation reaction, such as an atom transfer radical polymerisation (ATRP) reaction. Initiating moieties adapted to initiate an ATRP reaction are described herein. To provide initiating moieties adapted to initiate a metal-catalysed living polymerisation reaction such as an ATRP reaction, the initiating compound may be an alkyl halide-acid halide compound, which can react with reactive functional groups such as hydroxy or amino groups on an outer surface of a layer to form alkyl halide initiating moieties on the layer. Examples of appropriate initiating compounds are described herein.

In embodiments of the process of the invention the generated initiating moieties are adapted to initiate a ring-opening polymerisation (ROP) reaction. Initiating moieties adapted to initiate a ROP reaction are described herein. Such initiating moieties may be obtained from appropriate initiating compounds as described herein.

In embodiments of the process of the invention the generated initiating moieties are adapted to initiate a reversible-addition fragmentation transfer (RAFT) reaction. Initiating moieties adapted to initiate a RAFT reaction are described herein. Such initiating moieties may be obtained from appropriate initiating compounds as described herein.

In embodiments of the process of the invention the generated initiating moieties are adapted to initiate a nitroxide-mediated polymerisation (NMP) reaction. Initiating moieties adapted to initiate a NMP reaction are described herein. Such initiating moieties may be obtained from appropriate initiating compounds as described herein.

In embodiments of the process of the invention the generated initiating moieties are adapted to initiate cationic polymerisation reactions. Initiating moieties adapted to initiate a cationic reaction are described herein. Such initiating moieties may be obtained from appropriate initiating compounds as described herein.

In some embodiments of the process of the invention the generated initiating moieties are adapted to initiate an anionic polymerisation reaction. Initiating moieties adapted to initiate an anionic reaction are described herein. Such initiating moieties may be obtained from appropriate initiating compounds as described herein.

In some embodiments of the process of the invention the initiating moiety is adapted to initiate a catalytic transfer polycondensation reaction. Initiating moieties adapted to initiate a catalytic transfer polycondensation reaction are described herein. Such initiating moieties may be obtained from appropriate initiating compounds as described herein.

Figure 4:
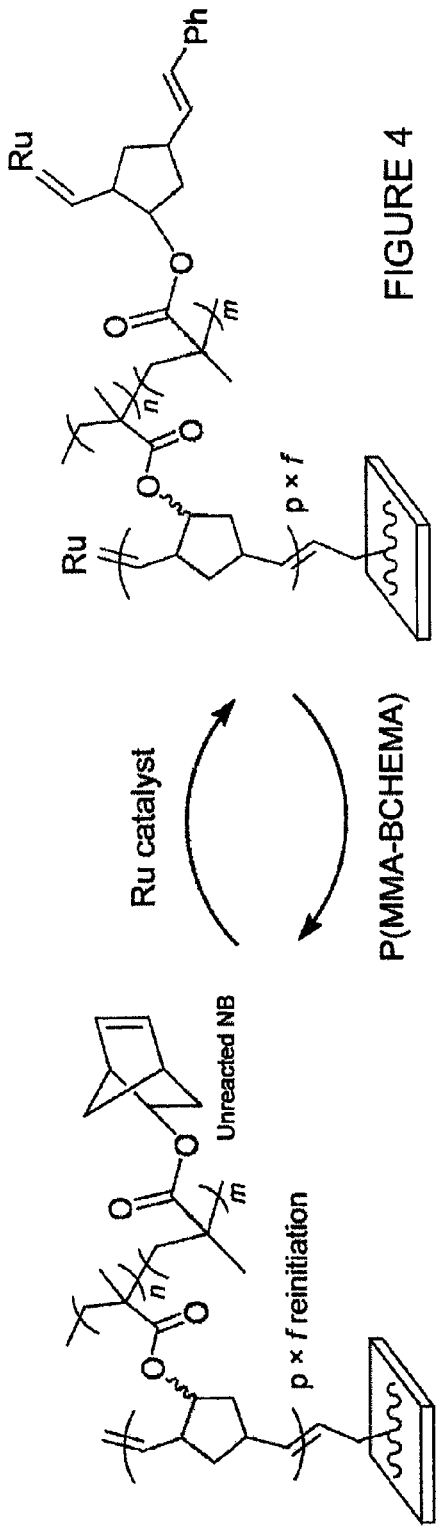
FIG. 4 is a scheme illustrating a re-initiation step for film formation in accordance with one embodiment of the invention.

An example of a re-initiation step is shown in FIG. 4. As illustrated in FIG. 4, alkene functionalities present in a layer of macromolecule can be regarded as reactive functional groups in a macromolecule layer. The alkene groups can be modified upon addition of fresh Ru catalyst as an initiating compound to generate new initiating moieties that are capable of re-initiating film formation. Contact of the generated initiating moieties with a macromolecule composition then enables the covalent attachment of subsequent layers macromolecules in perpetuity.

In embodiments of the invention an outer surface of a layer of the multilayer macromolecular film may include a mixture of two or more different reactive functional groups. The different reactive functional groups may be capable of reacting with different initiating compounds to generate a mixture of different types of initiating moieties on the surface of the layer. The presence of a mixture of different types of initiating moieties may be attractive where an additional level of control over film fabrication or the composition of the film is desired.

Once initiating moieties are generated on a surface of a layer to the multilayer macromolecular film to re-initiate the controllable polymerisation process, steps (c) and (d) as described herein can be repeated in order to deposit and attach additional layers of macromolecule to the film. In this way, the process of the invention allows a further stratum of macromolecule layers to be covalently attached to the surface of the layer to permit continued assembly in the multilayer macromolecular film.

The further stratum of macromolecule layers may be of the same composition, or of a different composition, to the first strata of macromolecule layers in the film. The process of the invention allows the preparation of two or more compositionally stratified layers in the multilayer macromolecular film.

Post-Film Formation Modification

In some embodiments, the process of the present invention may include the step of modifying the multilayer macromolecular film after its formation.

In one embodiment the process of the invention may include the step of modifying the film by forming a covalent bond between the film and a compound selected from the group consisting of antifouling agents, superhydrophobic agents, antimicrobials, chelating compounds, fluorescent compounds, antibodies, scavenging compounds, metals and physiologically active compounds. Such compounds may include at least one functional group that is capable of reacting with at least one reactive functional group of a macromolecule layer or initiating moieties on an outer surface of a macromolecule layer. In some embodiments the compounds may react with a plurality of reactive functional groups or a plurality of initiating moieties on a macromolecule layer to covalently attach a plurality of compounds to the layer. The compounds may modify an outer surface of a layer of the macromolecular film, or may infiltrate the layers of the macromolecular film and react with reactive functional groups or initiating moieties embedded within the macromolecular film. The ability to modify the multilayer macromolecular film with such compounds would permit biofunctionalization of the multilayer macromolecular film for application in areas such as targeted drug delivery, biosensing and biocatalysis.

In another embodiment of the invention, modification of the multilayer macromolecular film may include the step of removing the substrate used to form the film. A person skilled in the art would understand that the ability to remove the substrate would depend upon the nature of the substrate material.

In one embodiment of the process of the invention, when the multilayer macromolecular film is formed on a template particle, such as a colloidal particle, as a substrate, a core-shell material may be formed. In this instance, the template particle assists to define the core while the shell is comprised of a multilayer macromolecular film. Where a core-shell material is formed, the template may be capable of being removed from the core of the core-shell material under conditions that do not disrupt the multilayer macromolecular film that constitutes the shell material. A range of removable particulate templates would be known to a person skilled in the art. An example of a removal template particle is a silica particle. The removal of the template particle from the core gives rise to a core-shell material having a hollow core. The hollow core-shell materials may be regarded as nanoparticles or capsules. The removal of the template particle may be carried out by any suitable method and a person skilled in the relevant art would understand that the method would depend upon the nature of the template particle and/or the shell material of the core-shell particle. Preferably, the removal of the template particle is carried out by exposure to hydrofluoric acid. The hydrofluoric acid may have a concentration of from 0.01 to 10 M, more preferably from 1 to 10 M, most preferably about 5 M.

Figure 5:
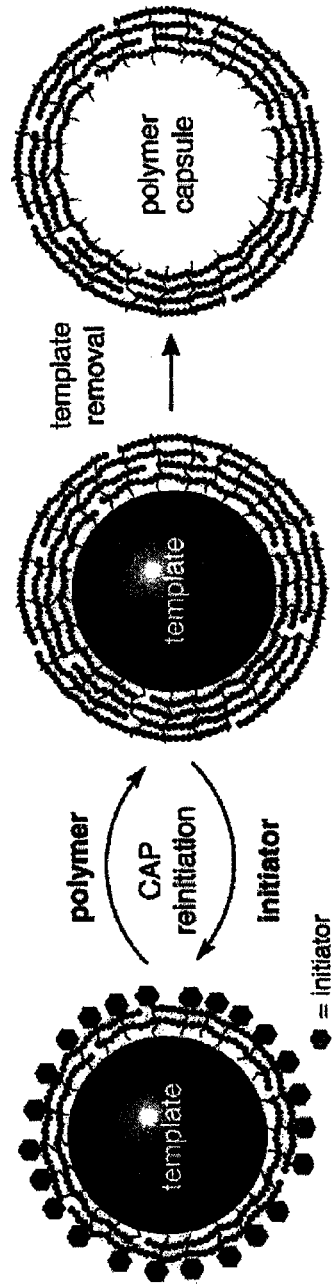
FIG. 5 is a scheme illustrating a process for the preparation of a polymer capsule in accordance with one embodiment of the invention.

An example of a process for preparing a capsule is shown in FIG. 5. As seen in FIG. 5, polymer capsules can be formed by continuous assembly of polymer on a particle template in accordance with the invention, followed by removal of the particle.

Applications

Multilayer macromolecular films formed by the process of the invention are stable and robust systems that may be used in a variety of applications, including biomaterials, drug delivery, catalytic, chelating, coating, targeting, anti-fouling, scavenging and bio-sensing applications.

Depending on the nature of the macromolecules used to prepare the multilayer macromolecular film, a range of useful physical characteristics may be obtained. In some embodiments, depending on the macromolecule used to prepare the film, the film may be responsive to various stimuli, including pH, temperature and light, and exhibit stimuli-responsive behaviour.

Benefits

The process of the invention provides a versatile platform for fabricating advanced and responsive multilayer structures for use in a range of applications, and provides one or more advantages over prior art methods.

The one or more advantages include:

Flexibility in film production as a single type or multiple types of macromolecules can be used in parallel or sequentially. This may also provide the ability to tune the morphology and function of the multilayer films by allowing structurally variable (i.e. linear, graft, star, hyperbranched, dendritic, helical) or compositionally variable (i.e. homopolymers, copolymers including block copolymers) macromolecules to be used.

Ability to form covalently cross-linked films with increased stability compared to electrostatic or hydrogen bonded films formed with conventional LbL techniques.

Ability to prepare films on a diverse range of surfaces and substrates.

Ability to fabricate films in both organic and aqueous media as a range of controlled polymerisation methods can be used and film preparation is not limited to a specific polymerisation method.

Ability to prepare multilayer macromolecular films, in the one-pot, without scale-up limitations due to the ability to continuously and perpetually attach subsequent macromolecule layers to the film. Ability to tailor the composition and structure of the film in three-dimensions (including horizontally and vertically) by selection of the type of initiating moiety, macromolecule and any spacer compound used to prepare the films, as well as the concentration or density of the initiating moiety.

Ability to tailor film thickness by adjusting reaction time or conditions, such as substrate contact time with the macromolecule composition, initiating moiety concentration and macromolecule concentration.

Ability to selectively re-functionalise the film with initiating moieties to re-initiate attachment of additional macromolecule layers to provide perpetual film growth.

One or more of the above advantages are currently not achievable with other nano-engineering techniques described in the relevant art. Thus the process of the invention provides a facile approach to preparing a range of multilayer macromolecular films of diverse structure and composition.

EXAMPLES

The present invention is described with reference to the following examples. It is to be understood that the examples are illustrative of and not limiting to the invention described herein.

Abbreviations
AIBN 2,2-Azobis(isobutyronitrile)
Ar Argon
BCHEMA Bicyclo[2,2,1]hept-5-en-2-yl methacrylate
DCC N,N'-Dicyclohexylcarbodiimide
DCM Dichloromethane
DEE Diethyl ether
DMAC N,N'-Dimethylacetamide
DMAP 4-(Dimethylamino)pyridine
DMF N,N'-Dimethylformamide
EVE Ethyl vinyl ether
HEA 2-Hydroxyethyl acrylate
MA Methacrylate
MMA Methyl methacrylate
NB Norbornene
PMDETA N,N,N',N'',N''-Pentamethyldiethylenetriamine
Si Silicon
TEA Triethylamine
THF Tetrahydrofuran 1. Polymer Preparation 1.1 Synthesis of bicyclo[2,2,1]hept-5-en-2-yl methacrylate (BCHEMA)

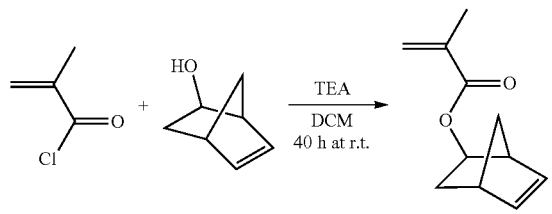

5-Norbonen-2-ol (5.0 g, 0.045 mol) and triethylamine (9.49 ml, 0.068 mol) were dissolved in DCM (50 ml) and cooled to 0° C. under argon. Methacryloyl chloride (5.32 ml, 0.055 mol) dissolved in DCM (50 ml) was added dropwise over 3 h, the reaction mixture was allowed to warm to room temperature and stirring was continued for a further 40 h. The insoluble precipitate was filtered off and the filtrate was concentrated in vacuo. The residue was dissolved in hexane (150 ml), washed with 0.25 M HCl (100 ml), 2 M HCl (2×50 ml), 2 M NaOH (3×50 ml), saturated NaCl (50 ml) and water (50 ml). The organic phase was dried over MgSO$_4$ overnight at 0° C. and some precipitation occurred. The insolubles were filtered and the filtrate was concentrated in vacuo to afford a yellow oil, 7.82 g (97%); $^1$H NMR (400 MHz, CDCl$_3$, TMS) (endo) $\delta_H$ 6.33 (dd, 1H, =CH), 5.97-6.00 (m, 2H, =CH+ CHH), 5.49 (s, 1H, CHH), 5.31-5.34 (m, 1H, CHO), 3.17 (br s, 1H, CH), 2.85 (br s, 1H, CH), 2.13-2.19 (m, 1H, CHH), 1.88 (s, 3H, CH$_3$), 1.43-1.51 (m, 1H, CHH), 1.34 (d, 1H, CHH), 0.96 (dt, 1H, CHH) ppm; (exo) $\delta_H$ 6.25 (dd, 1H, =CH), 6.08 (s, 1H, CHH), 5.97-6.00 (m, 1H, =CH), 5.53 (s, 1H, CHH), 4.72-4.73 (m, 1H, CHO), 2.92 (br s, 1H, CH), 2.85 (br s, 1H, CH), 2.43 (ddd, 1H, CHH), 1.94 (s, 3H, CH$_3$), 1.67-1.74 (m, 1H, CHH), 1.58-1.63 (m 1H, CHH), 1.43-1.51 (m, 1H, CHH) ppm; $^{13}$C NMR (100 MHz, CDCl$_3$, TMS) (endo) $\delta_C$ 167.8 (CO), 138.6 (=CH), 136.8 (=C(CH$_3$)), 131.7 (=CH), 125.2 (=CH$_2$), 75.5 (CHO), 47.8 (CH$_2$), 46.0 (CH), 42.4 (CH), 34.8 (CH$_2$), 18.4 (CH$_3$) ppm; (exo) $\delta_C$ 167.8 (CO), 141.3 (=CH), 137.0 (=C(CH$_3$)), 132.8 (=CH), 125.2 (=CH$_2$), 75.6 (CHO), 47.5 (CH$_2$), 46.5 (CH), 40.8 (CH), 34.9 (CH$_2$), 18.5 (CH$_3$) ppm. Ratio of exo:endo (%)=27:73.

1.2 Synthesis of poly(MMA-co-BCHEMA)

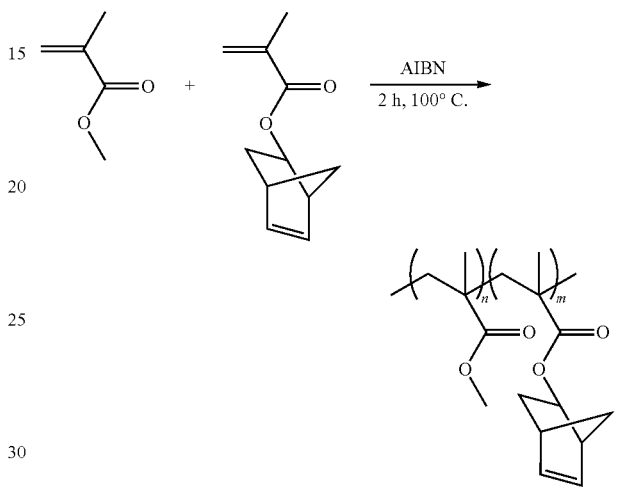

MMA (8.55 ml, 0.08 mol), BCHEMA (0.75 g, 0.004 mol) and AIBN (0.15 g, 0.001 mol) were dissolved in toluene (24.8 ml). The reaction mixture was deoxygenated via bubbling of argon for 1 h and then submerged in a 100° C. oil bath for 2 h. The reaction mixture was then diluted with a 2-fold excess of THF and precipitated into cold methanol (500 ml) to yield the product as a white solid, 2.6 g (33%); GPC-MALLS (THF): $M_w$=31.8 kDa, $M_w/M_n$=1.6.

1.3 Synthesis of poly((2-hydroxyethyl)acrylate) (PHEA)

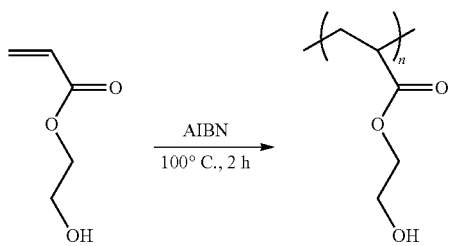

HEA (23 ml, 0.2 mol), azo-bis(cyanovaleric acid) (75% purity) (1.5 g, 4 mmol) and butanol (58 ml) was charged into a Schlenk tube and degassed by freeze-pump-thaw (×3) and backpurged with Ar. The reaction solution was stirred for 2 hours at 100° C. followed by precipitation in DEE. The polymer, present as an oily residue, was isolated from the mother liquor by centrifugation. Residual solvent was removed in vacuo to yield a clear tacky solid, 18.4 g (80%); GPC-MALLS (DMF): $M_w$=54.3 kDa, $M_w/M_n$=2.8.

1.4 Synthesis of poly((2-hydroxyethyl)acrylate-co-(2-(5-norboren-2-oxy)ethyl acrylate) (P(HEA-co-NB))

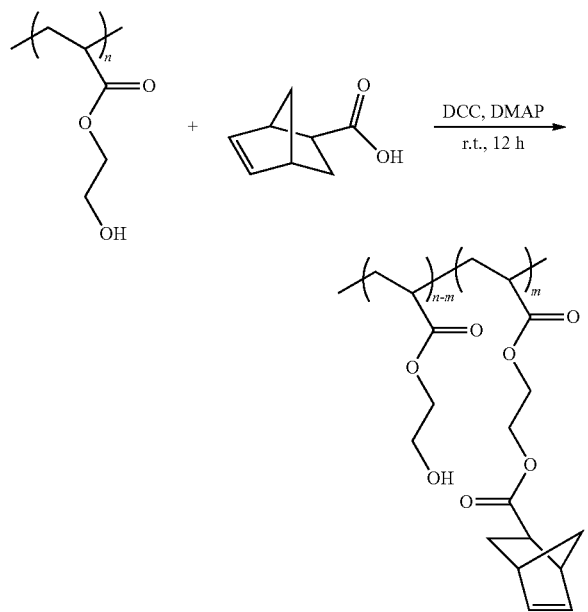

PHEA (1 g, 33.3 μmol) was dissolved in DMAC (15 ml). Separately, DCC (3.7 g, 17.9 mmol) was dissolved in 5 ml DMAC. The DCC solution was added to the polymer solution, followed by DMAP (44 mg, 0.36 mmol) and 5-norbornene-2-carboxylic acid (0.22 ml, 1.8 mmol). The reaction solution was stirred overnight at room temperature followed by precipitation in DEE. The polymer, present as an oily residue, was isolated from the mother liquor by centrifugation. Residual solvent was removed in vacuo to yield a clear tacky solid (1.014 g).

1.5 Synthesis of poly((2-hydroxyethyl)acrylate-co-(2-methacryloyloxyethyl)acrylate) (P(HEA-co-MA))

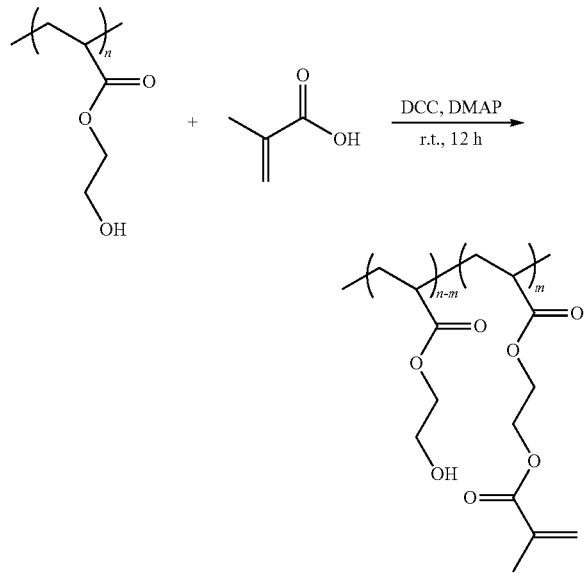

PHEA (70 mg, 1.8 μmol) was dissolved in DMAC (0.5 ml). Separately, DCC (63 g, 0.31 mmol) was dissolved in 0.5 ml DMAC. The DCC solution was added to the polymer solution, followed by DMAP (2 mg, 15.3 μmol) and methacrylic acid (9 μl, 0.10 mmol). The reaction solution was stirred overnight at room temperature followed by precipitation in DEE. The polymer, present as an oily residue, was isolated from the mother liquor by centrifugation. Residual solvent was removed in vacuo to yield a clear tacky solid (68 mg).

1.6 Synthesis of hyperbranched poly(N-allyl ethylene imine) (PAEI)

Poly(ethylene imine) (PEI) (Aldrich, $M_w$~25 kDa, 5.00 g, 0.20 mmol (116.14 mmol repeat units)) was dissolved in methanol (50 mL) under argon and cooled to 0° C. Allyl bromide (14.04 g, 116.02 mmol) was dissolved in methanol (20 mL) and added dropwise to the PEI over a period of 30 mins. The mixture was then heated under reflux for 13 h, cooled to room temperature and the volatiles removed in vacuo (20 mbar, 50° C.). The residue was dissolved in methanol (50 mL) under Ar and NaOH pellets (4.74 g, 118.50 mmol) were added. After refluxing for 1 h the mixture was concentrated in vacuo (0.05 mbar, 50° C.) to afford a tacky orange solid. The solid was dissolved in a mixture of toluene, tetrahydrofuran and methanol (1:2:2, 250 mL) and basic alumina (10 g) and $MgSO_4$ (10 g) were added. After stirring for 10 min the mixture was centrifuged (4400 rpm) and the supernatant was concentrated in vacuo (0.05 mbar, 50° C.). The resulting residue was dissolved in a mixture of dichloromethane and ethanol (5:1, 150 mL) and filtered through a 0.45 μm filter before being concentrated in vacuo (0.05 mbar, 50° C.) and redissolved in isopropanol (100 mL). The solution was centrifuged (4400 rpm) until the supernatant was almost clear and then the supernatant was concentrated in vacuo (0.05 mbar, 70° C.) to afford PAEI as a hygroscopic tacky orange solid (9.52 g, 98%); $^1$H NMR (400 MHz, $CD_3OD$) δH 2.57 (br s, $N(CH_2)_2N$), 3.11-3.20 (m, $CH_2=CHCH_2N$), 5.17-5.22 (m, $CH_2=CHCH_2N$), 5.85 (br s, $CH_2=CHCH_2N$) ppm.

1.7 Synthesis of 2-(2-(2-(3-(trimethylsilyl)prop-2-ynyloxy)ethoxy)ethoxy)ethyl methacrylate (TMSPgTEGMA)

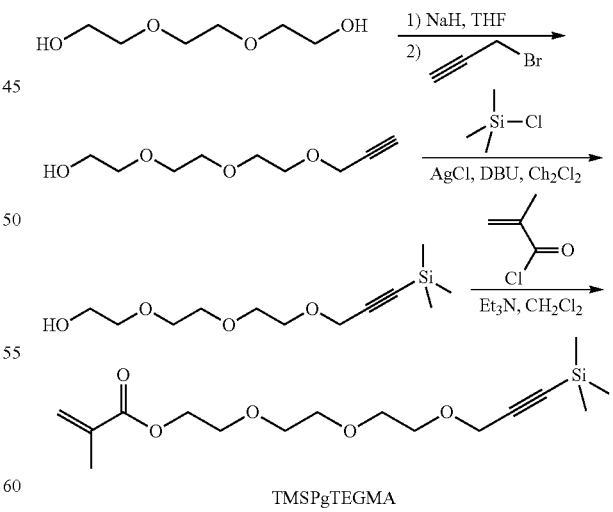

TMSPgTEGMA

Sodium hydride (2.0 g, 50 mmol, 60%) was slowly added to the THF solution of triethylene glycol (11.6 g, 76 mmol) at 0° C. The mixture was stirred for 20 min and propargyl bromide (4.2 mL, 38 mmol) was then added dropwise. The mixture was stirred at room temperature for 20 h, and then washed successively with saturated aqueous sodium hydrogen carbonate and water. The extracts were dried over MgSO₄, filtered, and concentrated under reduced pressure. The crude product was purified by column chromatography eluting with a 2:3 mixture of n-hexane and DEE to give the triethylene glycol alkyne 2-(2-(2-(prop-2-ynyloxy)ethoxy) ethoxy)ethanol as a light yellow oil after (4.5 g, 63%). $^1$H NMR (400 MHz, CDCl₃): δH 4.13 (2H, —OCH₂—C≡CH), 3.61-3.58 (10H, —CH₂ in ethylene glycol), 3.50 (2H, HO—CH₂—), 2.75 (1H, HO—), 2.38 (1H, CH≡C—) ppm.

The protection of the triethylene glycol alkyne was achieved by mixing with silver chloride (0.24 g, 1.8 mmol) suspended in 25 mL of dry dichloromethane, followed by addition of 1,8-diazabicyclo[5.4.0]undec-7-ene (3.5 g, 23 mmol). The reaction mixture was then heated to 40° C. and chlorotrimethylsilane (2.8 g, 26 mmol) added dropwise. After stirring for 24 hours at 40° C. the mixture was cooled to room temperature and diluted with 200 mL of n-hexane. The organic phase was washed successively with saturated aqueous sodium hydrogen carbonate, hydrochloric acid (1%) and water. The extracts were dried over MgSO₄, filtered, and concentrated under reduced pressure. The crude product was purified by column chromatography eluting with a 8:1 mixture of n-hexane and DEE to give the TMS-alkyne triethylene glycol 2-(2-(2-(3-(trimethylsilyl)prop-2-ynyloxy)ethoxy) ethoxy)ethanol as a light yellow colorless liquid (2.11 g, 45%). $^1$H NMR (400 MHz, CDCl₃): δH 4.13 (2H, —OCH₂—C≡CH), 3.61-3.58 (10H, —CH₂ in ethylene glycol), 3.50 (2H, HO—CH₂—), 2.15 (1H, HO—), 0.21 (9H, —Si(CH₃)₃) ppm.

Methacryloyl chloride (0.78 mL, 8 mmol) in 10 mL DCM was added dropwise to a mixture of the TMS-alkyne triethylene glycol (2.0 g, 7.7 mmol) and triethylamine (0.81 g, 8 mmol) in 50 mL DCM at 0° C. over 1 h. The mixture was then stirred at room temperature overnight and filtered to remove triethylamine hydrochloride. The filtrate was washed with saturated aqueous sodium hydrogen carbonate and water. The extracts were dried over MgSO₄, filtered, and concentrated under reduced pressure. The crude product was purified by column chromatography eluting DCM to give 2-(2-(2-(3-(trimethylsilyl)prop-2-ynyloxy)ethoxy)ethoxy)ethyl methacrylate (TMSPgTEGMA) as a light yellow colorless liquid (2.1 g, 88%). $^1$H NMR (400 MHz, CDCl₃): δH 6.15-5.51 (2H, CH₂=C(CH₃)—), 4.13 (2H, —OCH₂—C≡CH), 3.61-3.58 (10H, —CH₂ in ethylene glycol), 3.50 (2H, HO—CH₂—), 2.0 (2H, CH₂=C(CH₃)—), 0.21 (9H, —Si(CH₃)₃) ppm.

1.8 Synthesis of poly(oligoethylene glycol-co-propargyltriethylene glycol methacrylate) (poly(OEGMA-co-PgTEGMA))

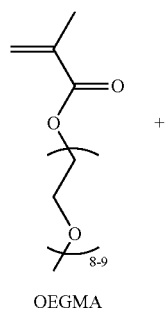

OEGMA

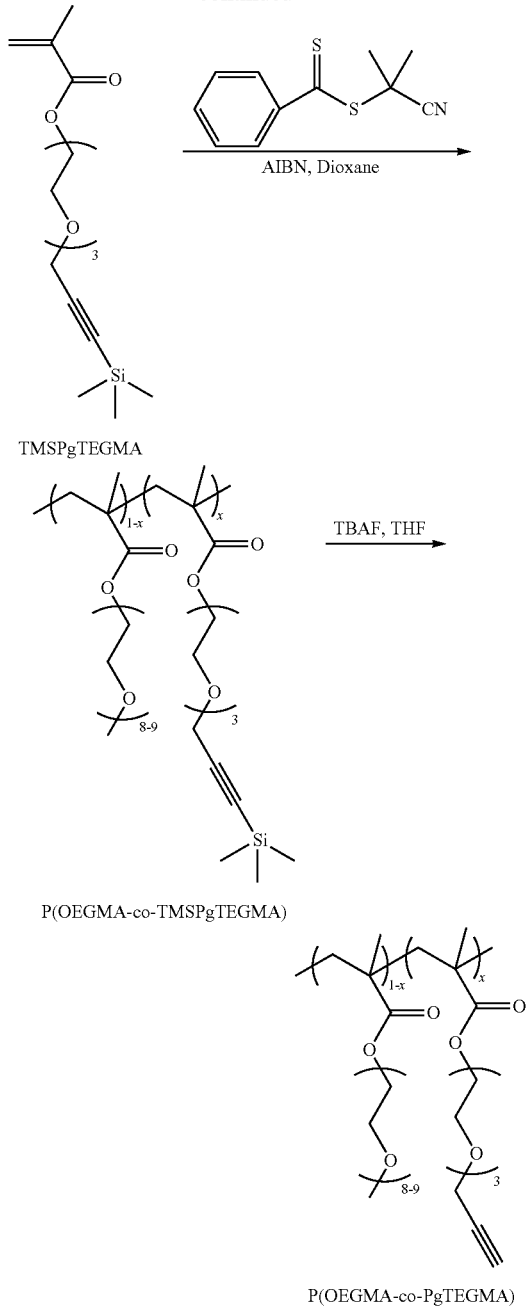

TMSPgTEGMA

P(OEGMA-co-TMSPgTEGMA)

P(OEGMA-co-PgTEGMA)

Poly(OEGMA-co-TMSPgTEGMA) was prepared by RAFT polymerization. In a typical run, OEGMA, TMSPgTEGMA, 2-cyanoprop-2-yl dithiobenzoate, and AIBN were dissolved in dioxane at the molar ratio of 60:40:1:0.125. The mixture was degassed through three freeze-thaw cycles and then reacted at 70° C. for 20 h. The mixture was quenched into liquid nitrogen to stop the polymerization and diluted with THF before it was precipitated into excess DEE. This precipitation procedure was repeated three times. The resulting product was dried overnight under vacuum at room temperature. The molecular weight and molecular weight distribution of the copolymer were determined by GPC-MALLS (THF): $M_n$=38 kDa, $M_w/M_n$=1.13. The actual degree of polymerization (DP) of the copolymer was determined to be 80 and the alkyne ratio in the copolymer was 35% from $^1$H NMR.

Poly(OEGMA-co-TMSPgTEGMA) (0.5 g, 0.43 mmol based on alkyne-trimethylsiyl groups) and acetic acid (37 µL, 0.65 mmol) were then dissolved in THF (10 mL). Argon was bubbled through the solution for 10 min, which was cooled to 0° C. A 0.2 M solution of tetra-n-butyl ammonium flouride in THF (3.2 mL, 0.65 mmol) was added slowly via syringe with vigorous stirring. The resulting solution was then stirred at room temperature for a further 20 h before being passed through a neutral alumina column. The solution was then concentrated under reduced pressure and precipitated in n-hexane. The isolated polymer was dried under vacuum with $^1$H NMR analysis confirming 100% removal of the TMS-protecting groups.

1.9 Synthesis of alkyne-functionalized poly(oligoethylene glycol methacrylate) ATRP initiator (poly(OEGMA-co-PgTEGMA-co-BIBTEGMA))

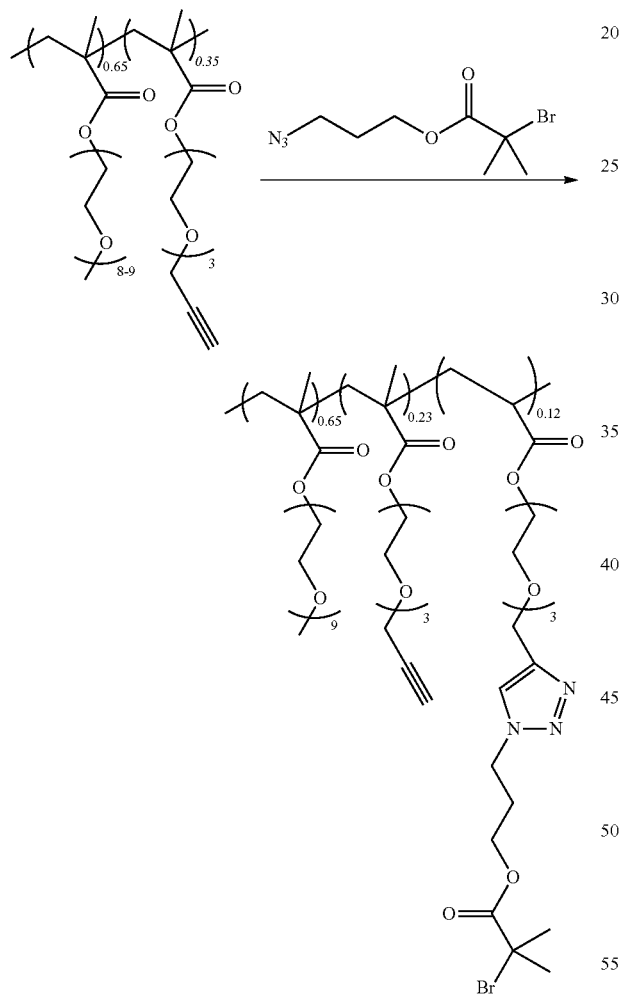

An azide functionalized ATRP initiator (azidepropyl 2-bromoisobutyrate, AzPBIB) was prepared by the esterification reaction of azide propanol with α-bromoisobutyryl bromide in anhydrous THF at 0° C. for overnight. AzPBIB was then introduced to alkyne-functionalized PEG copolymer via click chemistry. In a typical procedure, poly(OEGMA-co-PgTEGMA) (0.1 g, 0.09 mmol based on alkyne groups), AzPBIB (9.2 mg, 0.037 mmol), CuBr (5.3 mg, 0.037 mmol), PMDETA (6.4 mg, 0.037 mmol) and DMF (0.5 mL) were added to a Schlenk tube. The reaction tube was degassed by three freeze-pump-thaw cycles, sealed under vacuum, and placed in a 40° C. oil bath for 24 h. After cooling to room temperature, the flask was exposed to air. After removing most of the solvents at reduced pressure, the residues were dissolved in DCM and passed through a neutral alumina column to remove copper catalysts. The solution was then concentrated under reduced pressure and precipitated in hexane. The isolated polymer poly(OEGMA-co-PgTEGMA-co-BIBTEGMA) was dried under vacuum. The bromoisobutyrate ratio in the final copolymer is approximately 12% as determined by $^1$H NMR analysis.

2. Planar Substrate Preparation
2.1 Si Wafer/Quartz Preparation

Quartz slides were cleaned with Piranha solution (sulfuric acid:hydrogen peroxide=7:3). The slides were then sonicated in isopropanol:water (1:1) solution for 15 min and finally heated to 60° C. for 20 min in RCA solution (water:ammonia:hydrogen peroxide=5:1:1). The slides were washed thoroughly with Milli-Q water between each step. Silicon wafers used for both ellipsometry and AFM were prepared using the above procedure without the Piranha treatment. Caution! Piranha solution is highly corrosive. Extreme care should be taken during preparation and use.

2.2 Allyl Functionalization of Si Wafer by Condensation of Allyltriethoxysilane

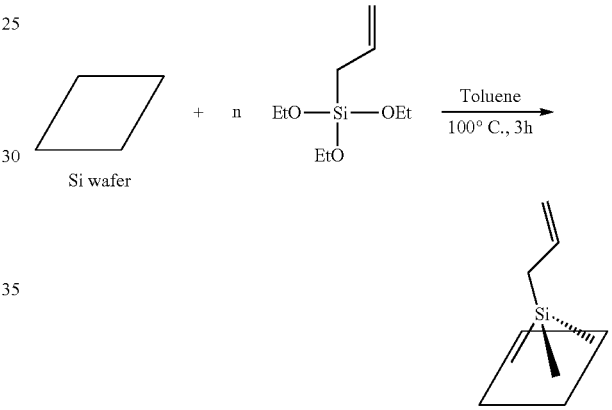

A dry 7 ml vial was equipped with a rubber septum and backpurged with argon. Toluene (1 ml) and allyltriethoxysilane (0.025 ml, 0.11 mmol) were added to the vial. The Si wafer (ca. 1 cm×1 cm) was then quickly added by removing and recapping the septum to minimize air infiltration. The vial was then submerged in a 100° C. oil bath for 3 hours. The Si wafer was then removed from the mixture, washed with toluene (×3) and DCM (×2). The allylated Si wafer was then ready for immediate functionalization with Ru catalyst.

2.3 Allyl Functionalization of Si Wafer by Deposition of PAEI

A Si wafer (ca. 1 cm×1 cm) was added to a 7 ml vial followed by addition of filtered PAEI solution (1 mg/ml in 0.5 M NaCl buffer). The vial was left for 30 min at room temperature, after which the Si wafer was removed and washed with water (×2), THF (×1) and DCM (×1). The allylated Si wafer was then ready for immediate functionalization with Ru catalyst.

2.4 Surface Immobilization of Ru Catalyst Initiating Moieties on Allylated Si Wafer

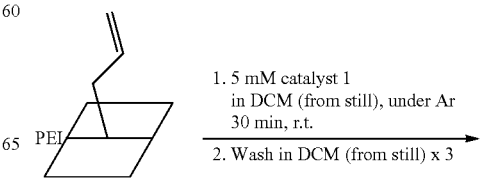

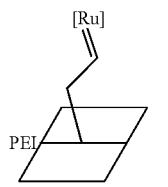

To a dry 50 ml round bottom flask equipped with magnetic stirrer bar and 3-way stopcock was added Ru catalyst (IMes)(Cl$_2$)(C$_5$H$_5$N)$_2$Ru=CHPh (7.7 mg, 5.3 μmol) and degassed DCM (10.5 ml) to yield a 0.5 mM stock solution. Separately, ten allylated Si wafers (from either method 2.2 or 2.3) were quickly added to individual 7 ml vials (dry, backpurged with argon) by removing and recapping the plastic cap. This was followed by addition of 1 ml of the catalyst stock solution, via a degassed syringe, to each of the vials. The Si wafers and stock solution were allowed to stand at room temperature for 30 min, after which the catalyst-functionalized substrate was removed and washed rapidly with degassed DCM (×3) before being immediately added to the CAP-ROMP reaction vial.

2.5 Formation of Alkyl Halide Initiator Layer Deposition on Si Wafer

A Si wafer (ca. 1 cm×1 cm) was added to a Eppendorf tube followed by addition of PEI solution (1 mg/ml in 0.5 M NaCl buffer) (5 ml). The vial was left for 15 min at room temperature, after which the Si wafer was removed and washed for one minute in milliQ water (×3). The Si wafer was then added to solutions of azide-functionalized poly(acrylic acid) (1 mg/ml) (3 ml), copper sulfate (1.8 mg/ml) (1 ml) and sodium ascorbate (4.4 mg/ml) (1 ml) All solutions were at pH 3. The vial was left for a further 15 min and the Si wafer washed as above. The Si wafer was then added to a solution of poly (OEGMA-co-PgTEGMA-co-BIBTEGMA) (as obtained from method 1.9) (1 mg/ml) (3 ml), copper sulfate (1.8 mg/ml) (1 ml) and sodium ascorbate (4.4 mg/ml) (1 ml). All solutions were at pH 3. The vial was left for a further 15 min, after which the Si wafer was washed as above and dried under Ar flow.

2.6 PEI Functionalization of Si Wafer

A Si wafer (ca. 1 cm×1 cm) was added to a Eppendorf tube followed by addition of PEI solution (1 mg/ml in 0.5 M NaCl buffer) (5 ml). The vial was left for 15 min at room temperature, after which the Si wafer was removed and washed for one minute in milliQ water (×3), THF (×1) and DCM (×1), and then vacuum dried.

3. Assembly of Multilayer Macromolecular Films on Planar Substrates

Example 1

3.1 Fabrication of PMMA Thin Film Via ROMP Procedure

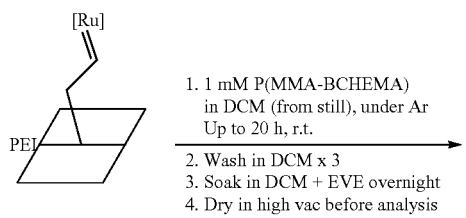

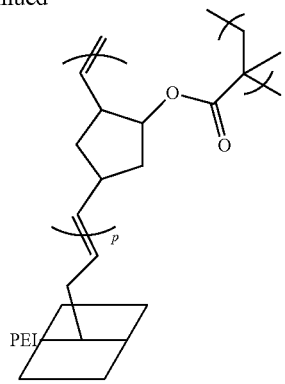

To a dry 50 ml round bottom flask equipped with magnetic stirrer bar and 3-way stopcock was added P(MMA-co-BCHEMA) (313 mg, 10.4 μmol) and degassed DCM (10.5 ml) to yield a 1 mM stock solution of polymer. Separately, ten Ru catalyst-functionalized Si wafers (functionalized with either 5 mM or 0.05 mM Ru catalyst) from method 2.4 were quickly added to individual 7 ml vials (dry, backpurged with argon) by removing and recapping the plastic cap. This was followed by addition of 1 ml of the stock solution of polymer, via a degassed syringe, to each of the vials. The substrate and polymer solution were allowed to stand at room temperature for a predetermined time, after which the polymer-coated wafers were removed and washed with DCM (×3) before being soaked overnight in a vial containing excess DCM (5 ml) and EVE (approx 0.1 ml). The PMMA thin film was then dried in vacuo before analysis.

Figure 6:
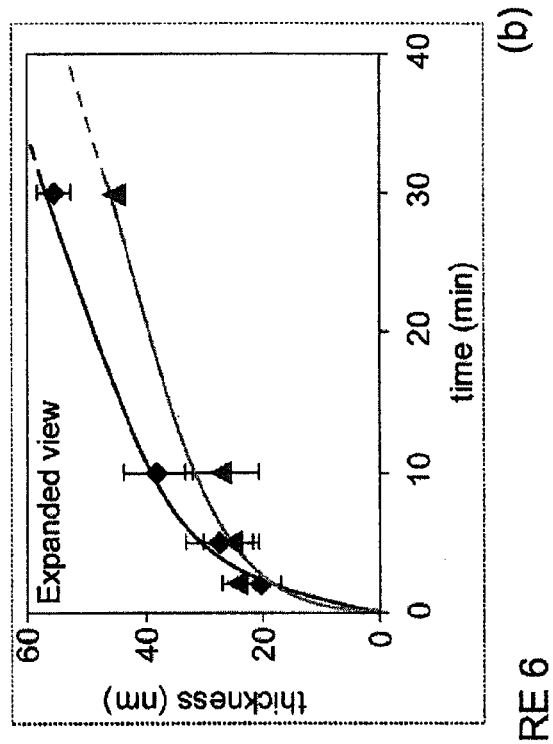
FIG. 6 is a graph illustrating (a) ROMP-mediated film growth versus time of a multilayer macromolecular film in accordance with one embodiment of the invention, including (b) an expanded view of the initial 30 min of reaction.
Figure 6:
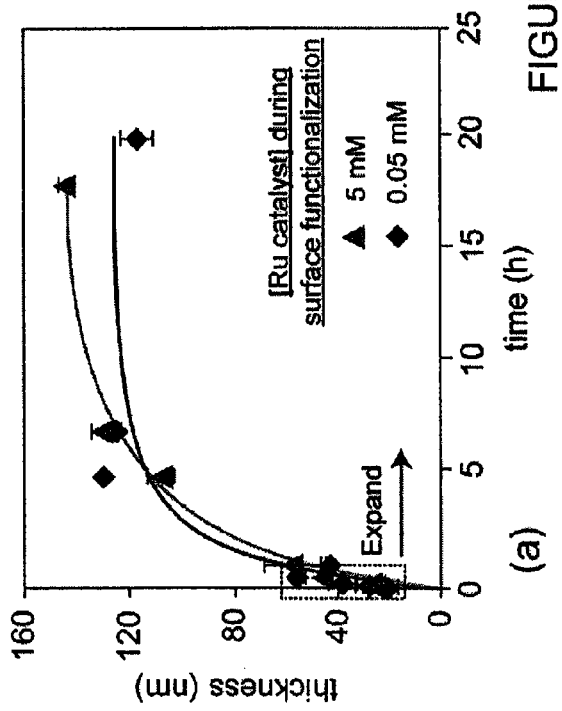

The thickness of the films formed by immersion in the polymer solution at various times is shown in FIG. 6(a). An expanded view of the first 30 minutes of reaction is shown in FIG. 6(b). As can be seen in FIG. 6, Si substrates functionalized with 5 mM and 0.05 mM Ru catalyst provide comparable film growth profiles, demonstrating catalyst saturation on the surface of the Si wafer.

Figure 7:
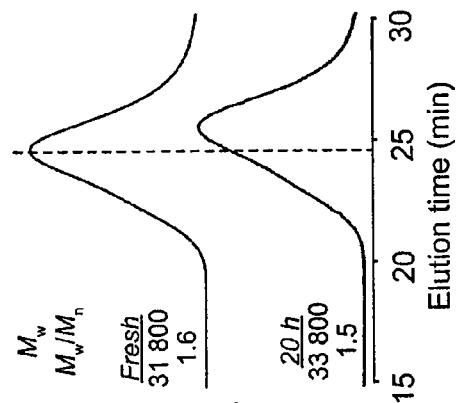
FIG. 7 is a GPC-MALLS chromatograph comparing samples of fresh polymer solution and polymer solution recovered after a ROMP reaction used to prepare a multilayer macromolecular film in accordance with one embodiment of the invention.

A sample of the polymer solution that has been in contact with the Ru catalyst functionalized Si wafer for approximately 20 hours was extracted from the vials and compared against fresh polymer solution that had not been exposed to the Ru catalyst functionalized Si wafer. GPC-MALLS (THF) chromatographs of the fresh polymer solution and polymer solution recovered after a ROMP reaction (20 h) is shown in FIG. 7. The comparable GPC traces and molecular weight data demonstrate that the ROMP reaction is confined to the surface of the substrate and no appreciable metathesis polymerisation reactions occur in the bulk polymer solution.

Example 2

3.2 Fabrication of PHEA Thin Film Via ROMP Procedure

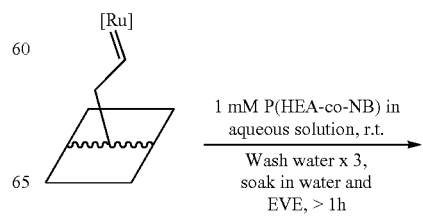

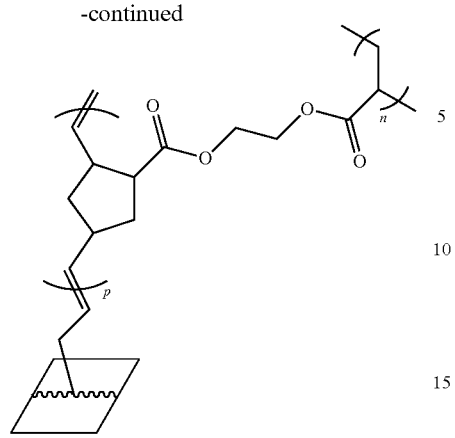

To a dry 50 ml round bottom flask equipped with magnetic stirrer bar and 3-way stopcock was added P(HEA-co-NB) (300 mg, 10.4 μmol) and degassed water (10.5 ml) to yield a 1 mM stock solution of polymer. Separately, ten Ru catalyst-functionalized Si wafers from method 2.4 were further washed with degassed THF (×1) and degassed water (×1), then quickly added to individual 7 ml vials (dry, backpurged with argon) by removing and recapping the plastic cap. This was followed by addition of 1 ml of the stock solution of polymer, via a degassed syringe, to each of the vials. The substrate and polymer solution were allowed to stand at room temperature for a predetermined time, after which the polymer-coated wafers were removed and washed with water (×3) before being soaked overnight in a vial containing excess water (5 ml) and EVE (approx 0.1 ml). The PHEA thin film was then dried under Ar flow before analysis.

Example 3

3.3 Fabrication of PHEA Thin Film Via ROMP Procedure in the Presence of Additives Method 3.2 was employed by using degassed aqueous HCl solutions (pH 1 or pH 3.5) or 50 mM $CuSO_4$ (pH neutral) solutions to prepare the polymer stock solutions instead of degassed water.

Figure 8:
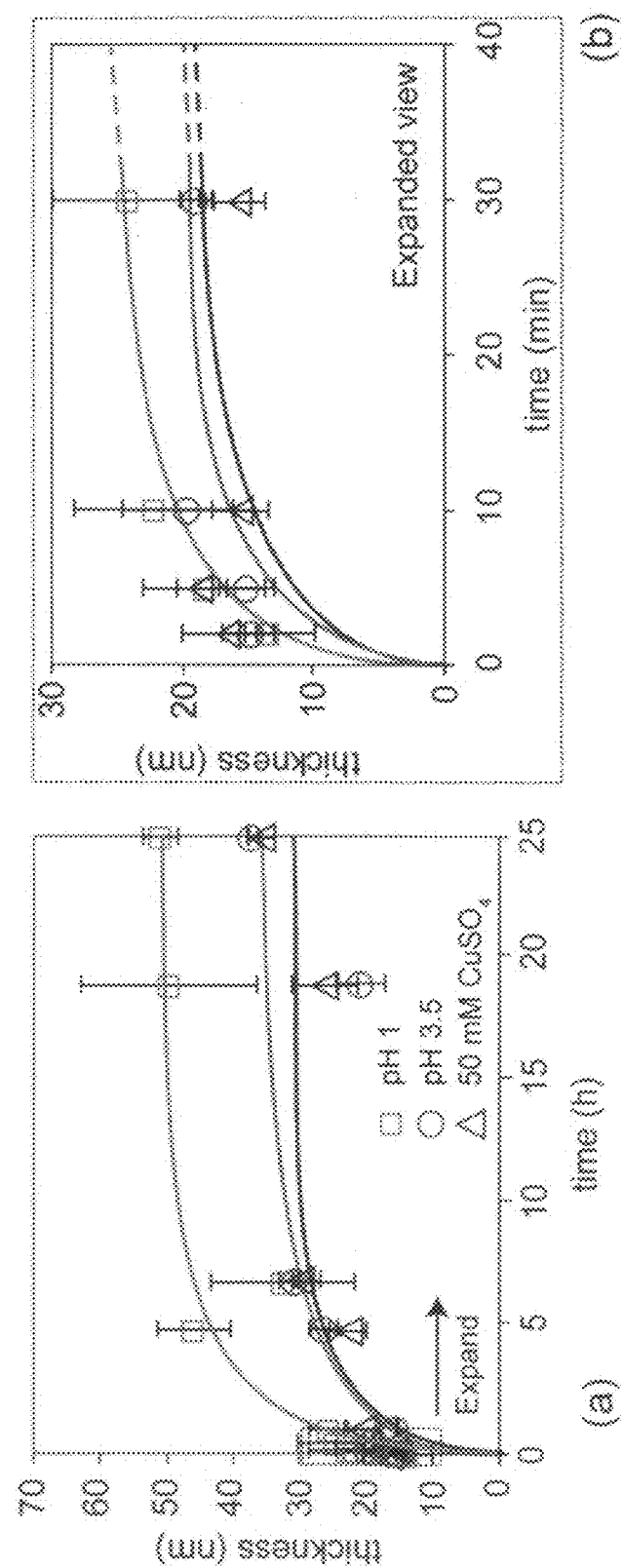
FIG. 8 is a graph illustrating (a) ROMP-mediated film growth versus time of a multilayer macromolecular film in aqueous macromolecule compositions at various pH in accordance with one embodiment of the invention, including (b) an expanded view of the initial 30 min of reaction.

The thickness of the films formed by immersion in aqueous polymer solutions at pH 1, pH 3.5 or pH approximately 7 (neutral) for various times is shown in 8(a). An expanded view of the first 30 minutes of reaction is shown in FIG. 8(b). As can be seen in FIG. 8, Si substrates functionalized with Ru catalyst are able to provide multilayer films in aqueous solution at various pH.

Example 4

3.4 Fabrication of PHEA Thin Film Via ATRP Procedure

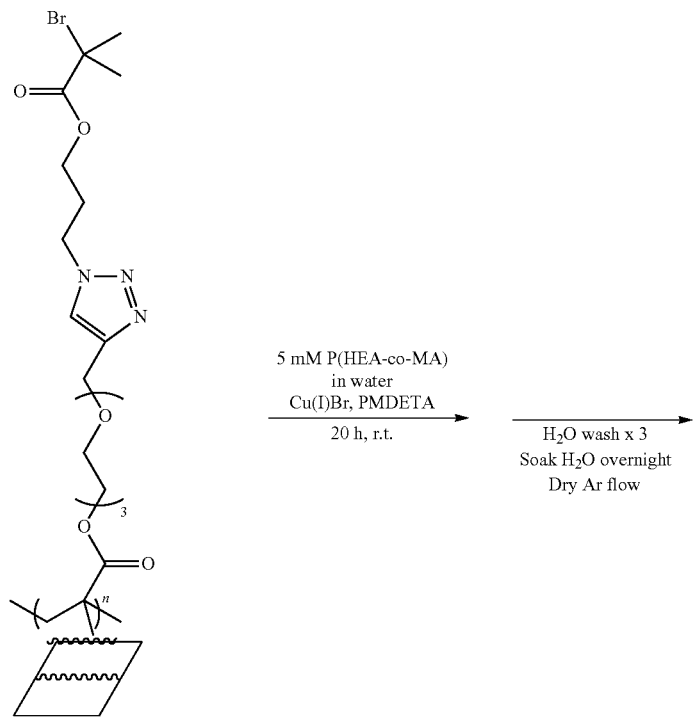

Layer
3: Poly (PEG-PEGalkyne-PEGbromo)
2: Poly(AA-azide)
1: PEI

-continued

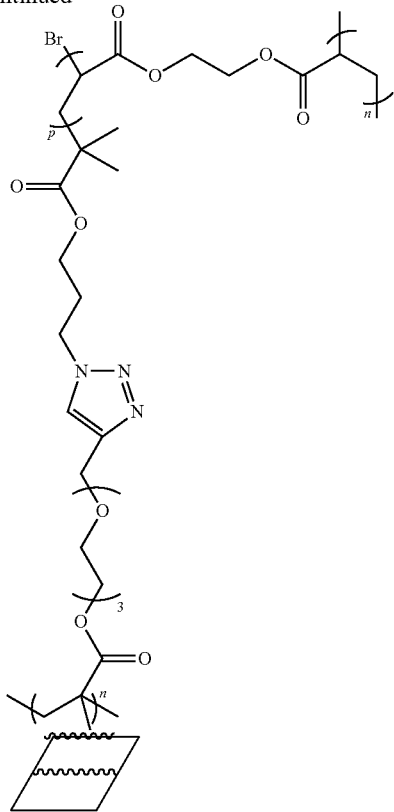

Figure 12:
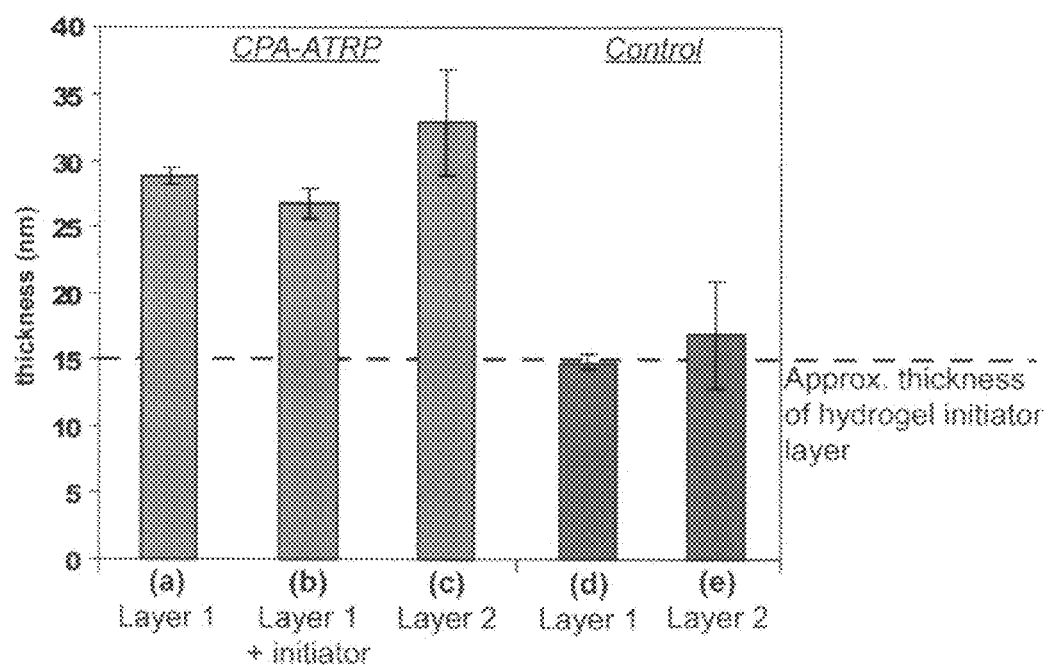
FIG. 12 is a graph illustrating the film growth of various macromolecule layers following multiple reinitiation of a film mediated by ATRP in accordance with one embodiment of the invention.

To a dry 50 ml round bottom flask equipped with magnetic stirrer bar and 3-way stopcock was added Cu(I)Br (15 mg, 105 µmol), P(HEA-co-MA) (321 mg, 10.7 µmol), PMDETA (0.078 ml, 37 µmol) and water (0.86 ml) to yield a 5 mM stock solution of reaction solution. This solution was degassed by freeze-pump-thaw (×3) and backpurged with Ar. Separately, an initiator-functionalized Si wafer from method 2.5 added to a 7 ml vials (dry, backpurged with argon), capped with a rubber septum and purged with Ar for 10 min. This was followed by addition of the reaction solution via a degassed syringe. The substrate and reaction solution were allowed to stand at room temperature for a predetermined time, after which the polymer-coated wafers were removed and washed with water (×3) before being soaked overnight in a vial containing excess water (5 ml). The PHEA thin film was then dried under Ar flow before analysis. Thickness data for films fabricated using this technique is shown in FIG. 12.

Example 5

3.5 Fabrication of PHEA Thin Film Via ARGET ATRP Procedure

A solution of Cu(I) catalyst at 1 mM and PHEA-MA at 1 mM (30 mg/mL) was prepared by dissolution of Cu(II)Br (2.35 mg, 10 µmol), PMDETA (6 µL, 30 µmol), sodium ascorbate (39.6 mg, 200 µmol) and PHEA-MA (300 mg, 10 µmol) in 10 mL of milli-Q water solution. The solution was then filtered with a 0.45 µm filter (Acrodisc Syringe Filter). Si wafers coated with the initiator layers were immersed vertically into the Cu(I) catalyst/PHEA-MA solution and allowed to polymerize for a predetermined time. To quench the reaction, the slides were washed 3 times with milli-Q water, soaked overnight in milli-Q water and then dried under air flow before ellipsometry or AFM analysis.

Figure 9:
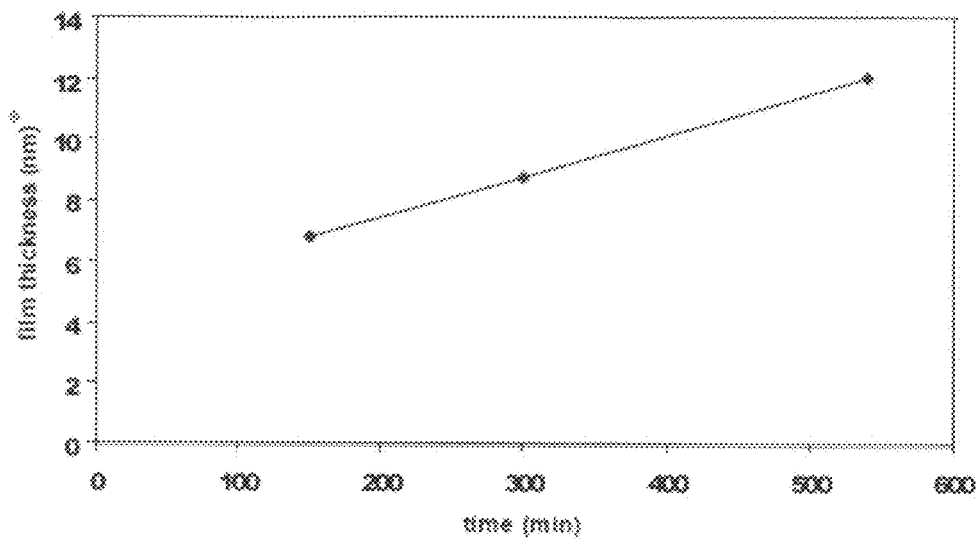
FIG. 9 is a graph illustrating ARGET ATRP-mediated film growth versus time of a multilayer macromolecular film in accordance with one embodiment of the invention.

The film growth over time for a multilayer film prepared using the above procedure is shown in FIG. 9.

Example 6

3.6 Assembly of Multilayer Macromolecular PMMA Thin Film Via ROP

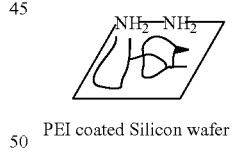

PEI coated Silicon wafer 1. 1 mM P(MMA-co-MODMM) and 0.05 mM TBD in anhydrous DCM, under Ar
   Up to 25 h, r.t.
2. Wash in DCM × 3
3. Soak in DCM overnight
4. Dry in high vac before analysis

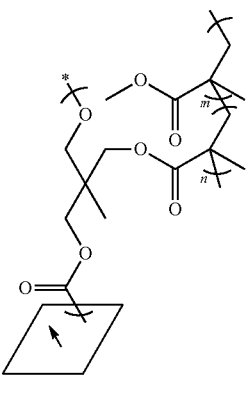

CAR-ROP films

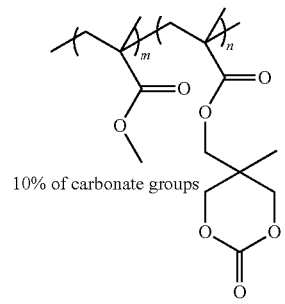

10% of carbonate groups

P(MMA-co-MODMM)

To a dry 50 ml round bottom flask equipped with magnetic stirrer bar and 3-way stopcock was added poly((methyl methacrylate)-co-((5-methyl-2-oxo-1,3-dioxan-5-yl)methyl methacrylate)) (P(MMA-co-MODMM)) ($M_n$=16 kDa, PDI=1.17), catalyst 1,5,7-Triazabicyclo[4.4.0]dec-5-ene (TBD) and anhydrous DCM to afford a stock solution with 1 mM of polymer and 0.05 mM of catalyst. Separately, PEI functionalised silicon wafers were added to individual plastic vials (dry, backpurged with argon) by removing and recapping the plastic cap. This was followed by addition of 1 ml of the stock solution, via a degassed syringe, to each of the vials. The substrate and polymer solution were allowed to stand at room temperature for a predetermined time, after which the polymer-coated wafers were removed and washed with DCM (×3) before being soaked overnight in a vial containing excess DCM (5 ml). The PMMA thin film was then dried in vacuo before analysis.

Figure 10:
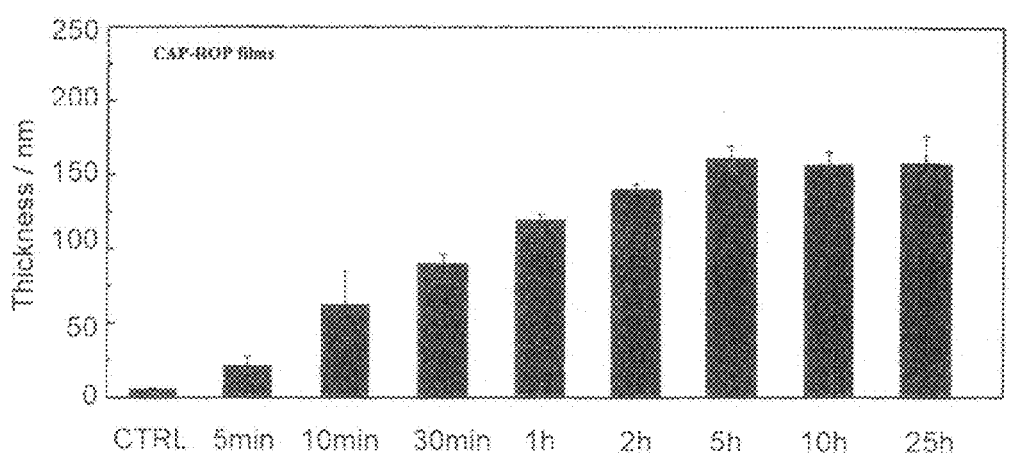
FIG. 10 is a graph illustrating ROP-mediated film growth versus time of a multilayer macromolecular film in accordance with one embodiment of the invention.

The thickness of the films formed by immersion in the polymer solution at various times is shown in FIG. 10, as

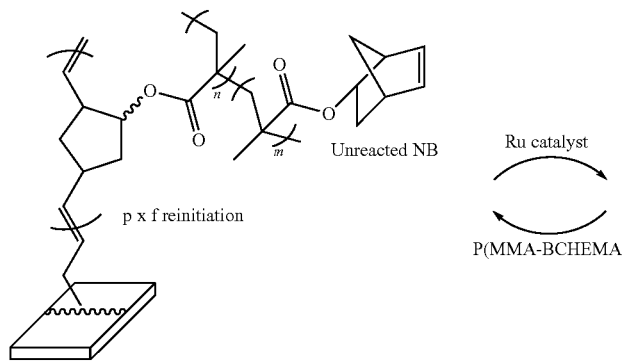

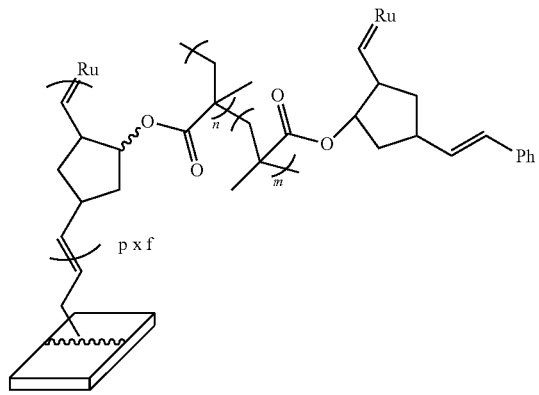

determined by ellipsometry. The control (CTRL) Si wafer that had been in contact with a 1 mM solution of the polymer in the absence of catalyst for 25 h.

CAP-ROP conducted with different concentration polymer solutions (0.01 mM, 0.1 mM, 1 mM and 10 mM) provided films with comparable thicknesses (~150 nm) after 25 h. Higher concentration polymer solutions led to more rapid film formation.

A sample of the polymer solution that has been in contact with the PEI functionalized Si wafer for approximately 25 hours was extracted from the vials and compared against fresh polymer solution that had not been exposed to the PEI functionalized Si wafer. GPC-MALLS (THF) chromatographs of the fresh polymer solution and polymer solution recovered after a ROP reaction (25 h) were obtained. The comparable GPC traces and molecular weight data observed demonstrate that the ROP reaction is confined to the surface of the substrate and no appreciable polymerisation reactions occur in the bulk polymer solution.

4. Reinitiation of Multilayer Macromolecular Films

Example 7

4.1 Surface Immobilization of Ru Catalyst Initiating Moieties to PMMA Thin Film

As with method 2.4, a dry 50 ml round bottom flask equipped with magnetic stirrer bar and 3-way stopcock was charged with Ru catalyst $(IMes)(Cl_2)(C_5H_5N)_2Ru=CHPh$ (1.5 mg, 1.0 μmol) and degassed DCM (2.1 ml) to yield a 0.5 mM stock solution. Separately, the PMMA thin film obtained from method 3.1 was quickly added to a 7 ml vial (dry, backpurged with argon) by removing and recapping the plastic cap. This was followed by addition of 1 ml of the catalyst stock solution via a degassed syringe. The PMMA thin film and stock solution were allowed to stand at room temperature for 30 min, after which the catalyst-functionalized substrate was removed and washed rapidly with degassed DCM (×3) before being immediately added to the reaction vial.

4.2 Reinitiation of PMMA Thin Film Via ROMP Procedure

As with method 3.1, a dry 50 ml round bottom flask equipped with magnetic stirrer bar and 3-way stopcock was charged with P(MMA-co-BCHEMA) (31.3 mg, 1.0 μmol) and degassed DCM (1.1 ml) to yield a 1 mM stock solution of polymer. Separately, the Ru catalyst-functionalized PMMA thin film obtained from method 4.1 was quickly added to a 7 ml vials (dry, backpurged with argon) by removing and recapping the plastic cap. This was followed by addition of 1 ml of the stock solution of polymer via a degassed syringe. The substrate and polymer solution were allowed to stand at room temperature for a predetermined time, after which the polymer-coated wafer was removed and washed with DCM (×3) before being soaked overnight in a vial containing excess DCM (5 ml) and EVE (approx 0.1 ml). The PMMA thin film was then dried in vacuo before analysis.

Figure 11:
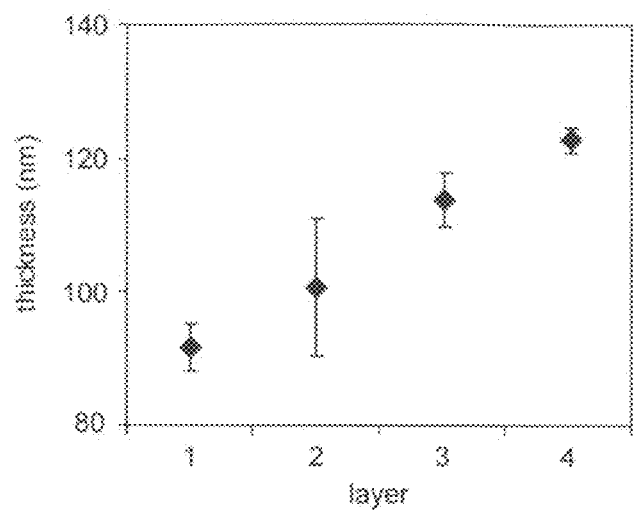
FIG. 11 is a graph illustrating the film growth of various macromolecule layers following multiple reinitiation of a film mediated by ROMP in accordance with one embodiment of the invention.

The film growth over time for a multilayer film prepared using the above reinitiation procedure is shown in FIG. 11. As seen in FIG. 11, multiple reinitiation of P(MMA-co-BCHEMA) film can be achieved by use of the ROMP procedure. Using the procedure, the first polymer layer (90 nm) was obtained after reaction (5 h) from an allylated Si wafer substrate. Layers 2-4 (10 nm each) were then obtained from repeated Ru catalyst functionalization of a formed polymer to generate new initiating moieties on the polymer and film growth from the reinitiated polymer.

Example 8

4.3 Surface Immobilization of Bromoisobutyrate Initiator to PHEA Thin Film

The PHEA thin film obtained from method 3.4 was added to a 7 ml vial (dry, backpurged with argon), followed by DMF (4 ml) and TEA (0.14 ml, 1.0 mmol). The vial was then cooled to 0° C. in an ice bath. Separately, bromoisobutyrylbromide (0.12 ml, 1.0 mmol) was diluted in DMF (0.74 ml) and this solution was slowly added to the vial containing the PHEA thin film. The vial was kept at 0° C. for 3 hours and then warmed to room temperature overnight. The initiator-functionalized substrate was removed and washed rapidly with DMF (×2) and water (×1) before being immediately added to the CAP-ATRP reaction vial.

4.4 Reinitiation Using ATRP Procedure from PHEA Thin Film

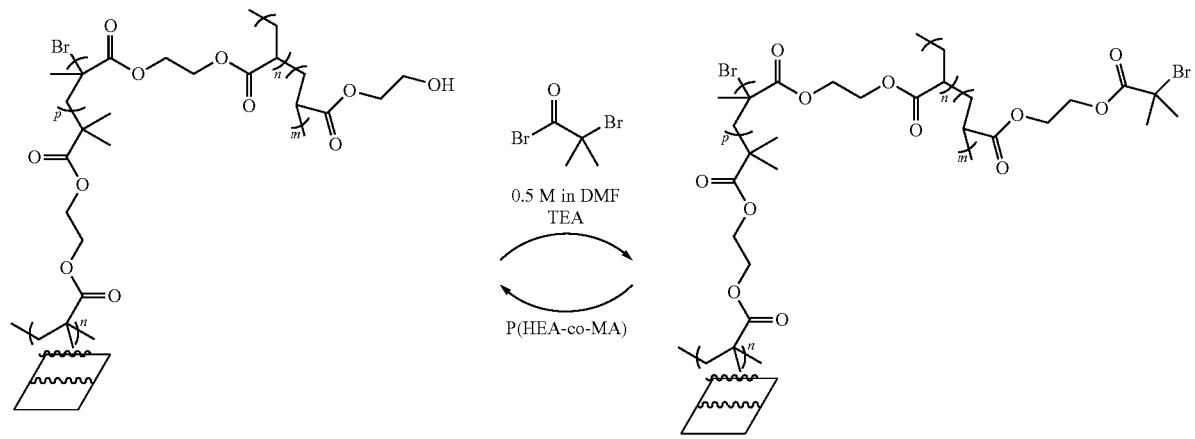

As with method 3.4, a dry 50 ml round bottom flask equipped with magnetic stirrer bar and 3-way stopcock was charged with Cu(I) Br (15 mg, 105 µmol), P(HEA-co-MA) (321 mg, 10.7 µmol), PMDETA (0.078 ml, 37 µmol) and water (0.86 ml) to yield a 5 mM stock solution of reaction solution. This solution was degassed by freeze-pump-thaw (×3) and backpurged with Ar. Separately, an initiator-functionalized substrate from method 4.3 was added to a 7 ml vial (dry, backpurged with argon), capped with a rubber septum and purged with Ar for 10 min. This was followed by addition of the reaction solution via a degassed syringe. The substrate and reaction solution were allowed to stand at room temperature for a predetermined time, after which the polymer-coated wafers were removed and washed with water (×3) before being soaked overnight in a vial containing excess water (5 ml). The PHEA thin film was then dried under Ar flow before analysis.

Results of film growth are shown in FIG. 12. As seen in FIG. 12, with ATRP-mediated film growth of P(HEA-co-MA) it was shown that (a) a film thickness of layer 1 of 14 nm can be obtained after 20 h reaction time, (b) alkyl halide-functionalization on the surface of layer 1 (layer 1+initiator) can give a film thickness of 12 nm and (c) reinitiation of the film by alkyl halide-functionalisation can provide a film thickness of 18 nm, which represents an increase of 4 nm (layer 2). In comparison, a substrate with no alkyl halide initiating moieties had less than 2 nm film growth under comparable conditions, demonstrating that film growth in (a)-(c) is mediated by ATRP. All film thicknesses have been subtracted with the initiator film thickness (ca. 15 nm) (as obtained from Method 2.5).

5. Non-Planar Substrate Preparation

Particles were used as non-planar substrate templates. Nonporous silica particles (5 wt % suspensions, average diameter 5.35±0.25 µm) ($SiO_2$) were obtained from Microparticles GmbH (Berlin, Germany). Mesoporous silica particles (Separon SGX 1000, diameter 4.5 µm, pore size 100 nm) (MS) were obtained from Tessek Ltd (Czech Republic). Melamine formaldehyde (MF) particles (10 wt % suspension average diameter 2.31±0.07 µm) were obtained from Microparticles GmbH (Berlin, Germany).

5.1 Formation of Ru Catalyst Initiating Moieties on Particles for CAP-ROMP $SiO_2$, MS and MF particles were prepared for CAP-ROMP (aq) by surface deposition of allyl-PEI and functionalizing with Ru catalyst. 1 mL of particles (0.5 wt % solution; $SiO_2$, MS or MF) was charged into an Eppendorf tube, washed with Milli-Q water (2×1 mL) and added to 1 mL of filtered allyl-PEI solution (1 mg/mL in 0.5 M NaCl buffer, passed through a 0.45 µm filter). The solution was left for 30 min at room temperature, isolated by centrifugation and subjected to gradient washing with Milli-Q water (2×1 mL), THF (2×1 mL) and DCM (1×2 mL). 1 mL of Ru stock solution (0.5 mM in DCM) was combined with the particles and left for 30 min at room temperature. The catalyst functionalized particles were isolated by centrifugation and subjected to gradient washing with DCM (1×1 mL), THF (2×1 mL), 50 mM $CuSO_4$ buffer (2×1 mL) before being added immediately into a CAP-active polymer solution.

5.2 Formation of Alkyl Halide Initiating Layer on Particles for CAP-ATRP $SiO_2$, MS and MF particles were primed with an initiating prelayer film. 200 µL of particles ($SiO_2$ and MS particles, 5 wt %; MF resin particles, 2 wt %) were first incubated in a PEI solution (10 kDa, 1 mg/mL in 0.5 M NaCl buffer) for 15 min at room temperature, isolated by centrifugation and washed for 1 min in 5 mM sodium ascorbate buffer at pH 3.5 (3×1 mL). The particles were then added to azide-functionalized poly(acrylic acid) (1 mg/mL, 500 µL) for 15 min. The particles were washed as above and then added to a solution of poly(OEGMA-co-PgTEGMA-co-BIBTEGMA) (1 mg/mL, 300 µL), copper sulfate (1.8 mg/mL, 100 µl) and sodium ascorbate (4.4 mg/ml, 100 µL) for a further 15 min at room temperature. The particles functionalized with bromo containing initiator poly(OEGMA-co-PgTEGMA-co-BIBTEGMA) were isolated by centrifugation and washed as above. All solutions were adjusted to pH 3.5 with 0.1 M HCl buffer.

6. Assembly of Multilayer Macromolecular Film on Non-Planar Substrates

Example 9

6.1 Fabrication of Multilayer Film on Non-Planar Substrate Via ROMP Procedure A suspension of the Ru catalyst-functionalised particles (1 mL, 0.5 wt %) were combined with 1 mL of FITC labelled poly((2-hydroxyethyl)acrylate-co-(2-(5-norboren-2-oxy) ethyl acrylate) (P(HEA-co-NOEA)) solution (1 mM in 50 mM $CuSO_4$ solution) in an Eppendorf tube. The mixture was agitated with an orbital shaker at room temperature for a predetermined time and the CAP-ROMP process was terminated by the addition of excess diethylene glycol vinyl ether (100 μL). After 5 min the particles were isolated by centrifugation, washed with DMF (3×1 mL), soaked in DMF (1 mL) for 12 h, and washed with water (3×1 mL) prior to analysis. The presence of the polymer layer on the particles was demonstrated by fluoroescence microscopy.

Figure 13:
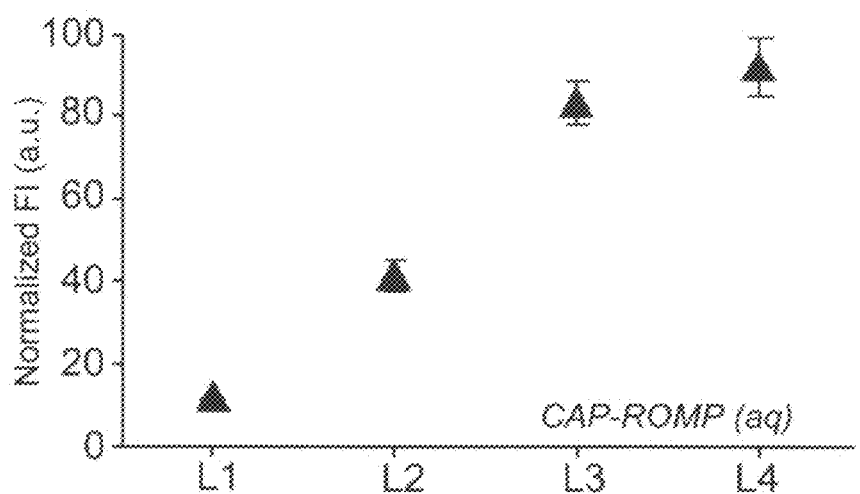
FIG. 13 is a graph illustrating film growth mediated by ROMP on a non-planar substrate in accordance with one embodiment of the invention, as demonstrated by fluorescence microscopy.

The single layer (L1) P(HEA-co-NOEA)-based CAP-ROMP films assembled on particles ($SiO_2$, MF or MS) as prepared above were, after capping, combined with 1 mL of Ru catalyst stock solution (0.5 mM in DCM) in an Eppendorf tube and allowed to stand for 30 min at room temperature. The catalyst-functionalized particles were isolated by centrifugation, washed with DCM (1 mL), THF (2×1 mL), 50 mM $CuSO_4$ buffer (2×1 mL) and combined with 1 mL of FITC labeled P(HEA-co-NOEA) solution (1 mM in 50 mM $CuSO_4$ buffer) in an Eppendorf tube. The mixture was agitated with an orbital shaker at room temperature for a predetermined time and the CAP-ROMP process was terminated by the addition of excess diethylene glycol vinyl ether (100 μL). After 5 min the particles were isolated by centrifugation, washed with DMF (3×1 mL), soaked in DMF (1 mL) for 12 h, and washed with water (3×1 mL) to afford L2 P(HEA-co-NOEA)-based CAP films on particles. After analysis the reinitiation and layering steps were repeated using the above described procedure to afford particles with up to 4 CAP-ROMP assembled P(HEA-co-NOEA)-based layers. The build-up of polymer layers on the particles was demonstrated by fluorescence microscopy (FIG. 13), which showed an increase in fluorescent intensity after each layer.

Example 10

6.2 Fabrication of Multilayer Film on Non-Planar Substrate Via ATRP Procedure A suspension of the bromo-initiator functionalised particles ($SiO_2$: 5 wt %, 100 μL; MF: 2 wt %, 100 μL; MS: 5 wt %, 25 μL) were combined with 400 μL of an aqueous stock solution (pre-filtered through a 0.45 μm filter) containing FITC labelled poly((2-hydroxyethyl)acrylate-co-(2-methacryloyloxyethyl)acrylate) (P(HEA-co-MOEA)) (1 mM), $CuBr_2$ (1 mM), PMDETA (3 mM) and sodium ascorbate (20 mM). The mixture was agitated with an orbital shaker at room temperature for either 10 ($SiO_2$ and MF) or 24 h (MS) and the particles were isolated by centrifugation, washed for 1 min in water (3×1 mL) and soaked in water (1 mL) for 12 h prior to analysis.

6.3 $SiO_2$ and MF particles

Figure 14:
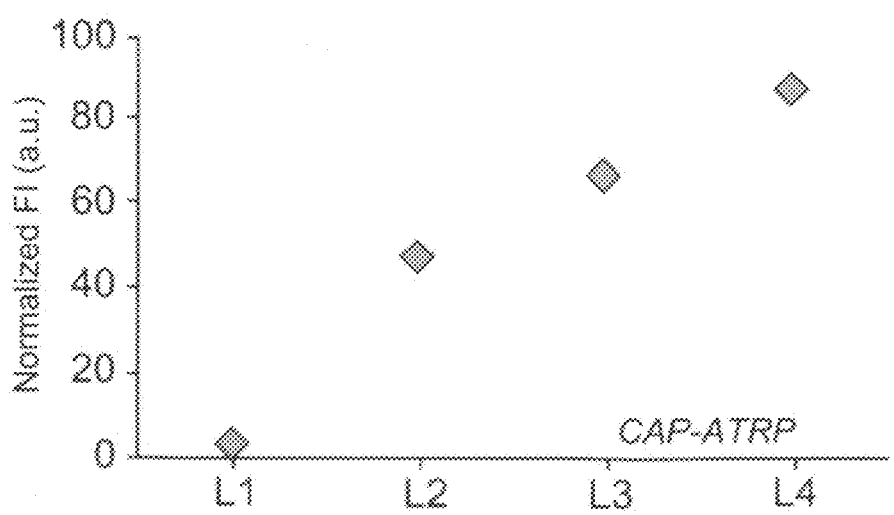
FIG. 14 is a graph illustrating film growth mediated by ATRP on a non-planar substrate in accordance with one embodiment of the invention, as demonstrated by fluorescence microscopy.
Figure 15:
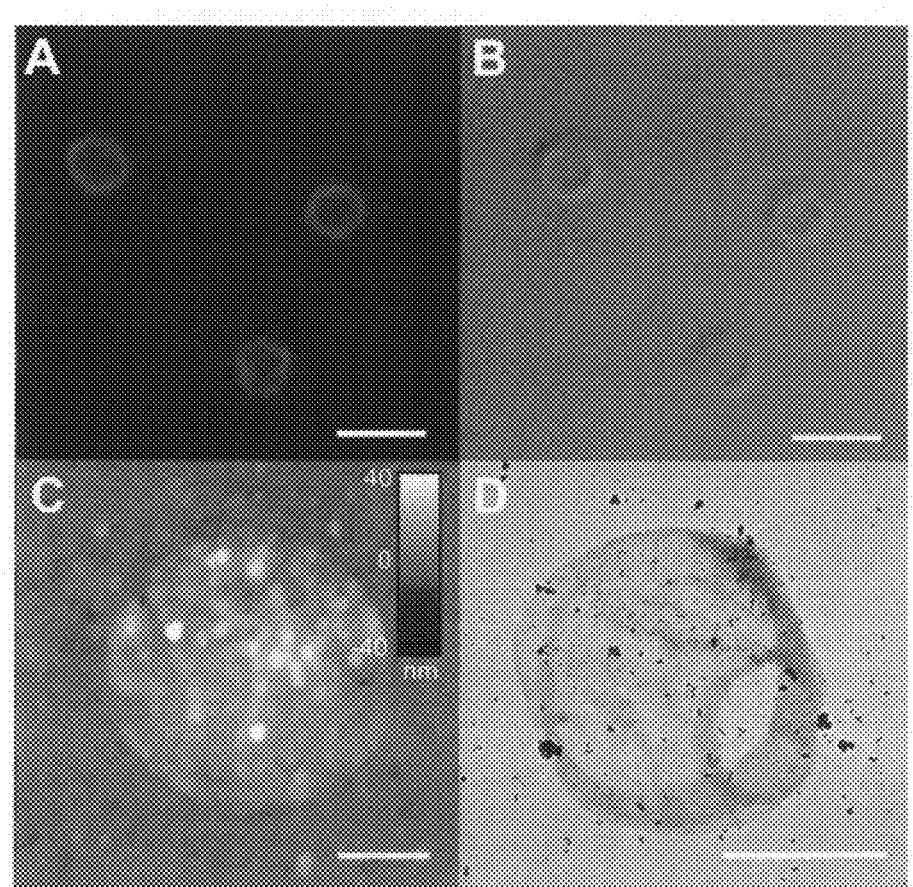
FIG. 15 illustrates (a) a fluorescence microscopy image, (b), an optical microscopy image, (c) an AFM image and (d) a TEM image of polymer capsules prepared using ROMP mediated film growth in accordance with one aspect of the invention.
Figure 16:
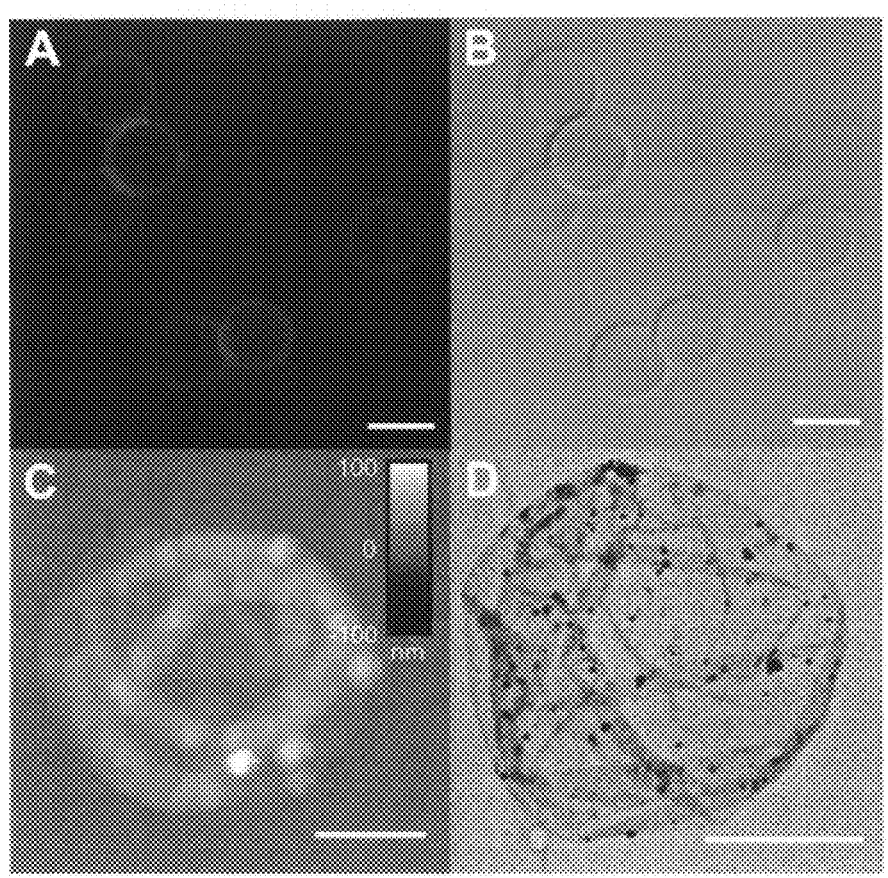
FIG. 16 illustrates (a) a fluorescence microscopy image, (b), an optical microscopy image, (c) an AFM image and (d) a TEM image of polymer capsules prepared using ATRP mediated film growth in accordance with one aspect of the invention.

The single layer (L1) P(HEA-co-MOEA)-based CAP-ATRP films assembled on $SiO_2$ or MF particles as prepared above were washed for 1 min in anhydrous DMF (3×1 mL), dispersed in DMF (0.4 mL) in an oven dried vial at 0° C. and TEA (0.04 mL, 0.25 mmol) was added. Separately, α-bromoisobutyryl bromide (0.065 mL, 0.5 mmol) was dissolved in DMF (0.4 mL) and slowly added to the particles. The dispersion was kept at 0° C. for 3 h and then room temperature for 4 h. The particles were isolated by centrifugation, washed for 1 min with water (1 mL) and DMF (2×1 mL) and 400 μL of an aqueous stock solution (pre-filtered through a 0.45 μm filter) containing FITC labeled P(HEA-co-MOEA) (1 mM), $CuBr_2$ (1 mM), PMDETA (3 mM) and sodium ascorbate (20 mM) was added. The mixture was agitated with an orbital shaker at room temperature for 10 h and the particles were isolated by centrifugation, washed for 1 min in water (3×1 mL) and soaked in water (1 mL) for 12 h. After analysis the reinitiation and layering steps were repeated using the above described procedure to afford particles with up to 4 CAP-ATRP assembled P(HEA-co-MOEA)-based layers. The build-up of polymer layers on the particles was demonstrated by fluorescence microscopy (FIG. 14), which showed an increase in fluorescent intensity after each layer.

6.4 MS Particles

The single layer (L1) P(HEA-co-MOEA)-based CAP-ATRP assembled films on particles (MS) as prepared above were washed for 1 min in anhydrous DMF (3×1 mL), dispersed in DMF (0.4 mL) in an oven dried vial at 0° C. and TEA (0.04 mL, 0.25 mmol) was added. Separately, α-bromoisobutyryl bromide 3 (0.065 mL, 0.5 mmol) was dissolved in DMF (0.4 mL) and slowly added to the particles. The dispersion was kept at 0° C. for 3 h and then room temperature for 4 h. The particles were isolated by centrifugation, washed for 1 min with water (1 mL) and DMF (2×1 mL) and 400 μL of an aqueous stock solution (pre-filtered through a 0.45 μm filter) containing RITC labeled P(HEA-co-MOEA) (1 mM), $CuBr_2$ (1 mM), PMDETA (3 mM) and sodium ascorbate (20 mM) was added. The mixture was agitated with an orbital shaker at room temperature for 24 h and the particles were isolated by centrifugation, washed for 1 min in water (3×1 mL) and soaked in water (1 mL) for 12 h to afford MS particles coated with stratified P(HEA-co-MOEA)-FITC (L1) and P(HEA-co-MOEA)-RITC (L2) layers.

7. Preparation of Polymer Capsules and Replica Spheres

Example 11

7.1 Preparation of Polymer Capsules

Polymer capsules were prepared by dissolving the underlying silica core of the $SiO_2$ particles coated with CAP film. For CAP-ROMP, 1 μL of P (HEA-co-NOEA)-coated (core-shell) particle suspension (1 wt %) were adsorbed on a PEI-coated optical slide and brought in contact with 2 μL of ammonium fluoride (8 M) buffered HF (2 M, pH 4) for 1 min. The slide was then washed with Milli-Q water (3×50 mL). Capsule formation was confirmed by fluorescence microscopy, optical microscopy, AFM and TEM (FIGS. 15a-d, respectively; scale bars 5 micron for a and b, 2 micron for c and d).

For CAP-ATRP, 20 μL of P(HEA-co-MOEA)-coated (core-shell) particle suspension (1 wt %) was combined with 40 μL of ammonium fluoride (8 M) buffered HF (2 M, pH 4) and mixed very gently for 10 min. The formed capsules were then centrifuged at low speed (1500 rpm) for 15 min and washed in Milli-Q water (3×1 mL). Capsule formation was confirmed by fluorescence microscopy, optical microscopy, AFM and TEM (FIG. 16a-d, respectively; scale bars 5 micron for a and b, 2 micron for c and d).

The profile of the CAP capsules was also analysed with AFM. Height mode AFM images demonstrated that capsules prepared according the above methods had substantially even wall thickness and a hollow interior.

Example 12

7.2 Preparation of Polymer Replicas

Figure 17:
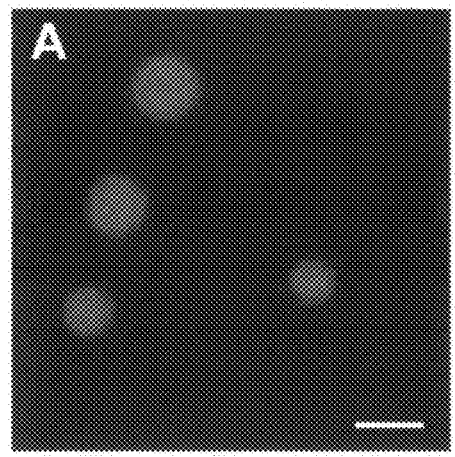
FIG. 17 illustrates a polymer replica formed after substrate removal, in accordance with one embodiment of the invention.

Polymer replicas were prepared by dissolving the underlying silica matrix of the MS particles coated with CAP film. The CAP film-coated particle suspension (30 μL, 1 wt %) was combined with 150 μL of ammonium fluoride (8 M) buffered HF (2 M, pH 4) and mixed very gently for 1 h. The formed replicas were centrifuged at low speed (1500 rpm) for 10 min and washed in Milli-Q water (3×1 mL). Polymer replica formation was confirmed by fluorescence microscopy (FIG. 17).

It is understood that various other modifications and/or alterations may be made without departing from the spirit of the present invention as outlined herein.

The invention claimed is:

1. A process for the preparation of a cross-linked multilayer macromolecular film including the steps of:
    (a) contacting a substrate having a surface and a plurality of initiating moieties on the surface with a macromolecule composition including a macromolecule having a plurality of polymerisable functional groups capable of reacting with the plurality of initiating moieties on the surface of the substrate;
    (b) reacting the initiating moieties with the polymerisable functional groups of the macromolecule to form a plurality of cross-links between the surface of the substrate and the macromolecule to covalently attach a layer of the macromolecule to the surface and regeneration of a plurality of initiating moieties on an outer surface of the macromolecule layer;
    (c) contacting the plurality of initiating moieties on the surface of the macromolecule layer with a further macromolecule in the macromolecule composition, the further macromolecule having a plurality of polymerisable functional groups capable of reacting with the plurality of initiating moieties on the surface of the macromolecule layer; and
    (d) reacting the initiating moieties on the surface of the macromolecule layer with the polymerisable functional groups of the further macromolecule to form a plurality of crosslinks between the surface of the macromolecule layer and the further macromolecule to covalently attach a subsequent layer of the macromolecule to the surface and regeneration of a plurality of initiating moieties on an outer surface of the subsequently attached macromolecule layer,
    wherein each initiating moiety is adapted to initiate a controlled polymerization reaction; and
    wherein steps (a), (b), (c) and (d) are carried out concurrently in a single reaction vessel.

2. A process according to claim 1 wherein steps (c) and (d) are repeated one or more times to provide a cross-linked multilayer macromolecular film including a plurality of cross-linked macromolecule layers, wherein each subsequent macromolecule layer is covalently attached to the surface of the macromolecule layer underlying it.

3. A process according to claim 1 wherein each cross-link between a surface and a macromolecule is formed by directly reacting an initiating moiety on the surface with a polymerisable functional group of the macromolecule.

4. A process according to claim 1 wherein the macromolecule composition includes a spacer compound adapted to react with an initiating moiety on a surface, and wherein each cross-link between a surface and a macromolecule is formed by reacting an initiating moiety on the surface with a polymerisable functional group of the macromolecule via the spacer compound.

5. A process according to claim 1 wherein a subsequently attached layer of the multilayer macromolecular film includes a plurality of reactive functional groups on an outer surface and wherein the process further includes the step of reacting at least one of the plurality of reactive functional groups with an initiating compound to generate at least one initiating moiety on the surface of the subsequently attached layer, wherein the initiating moiety generated on the surface is capable of reacting with a polymerisable functional groups of a macromolecule.

6. A process according to claim 5 wherein steps (c) and (d) are repeated one or more times to covalently attach a further stratum of cross-linked macromolecule layers to the subsequently attached layer.

7. A process according to claim 1 wherein at least one initiating moiety is adapted to initiate a ring opening polymerisation reaction.

8. A process according to claim 7 wherein at least one initiating moiety is adapted to initiate a ring opening metathesis polymerisation (ROMP) reaction.

9. A process according to claim 8 wherein the initiating moiety includes a metal.

10. A process according to claim 9 wherein the metal is selected from the group consisting of ruthenium, molybdenum, titanium, tungsten, osmium and iron.

11. A process according to claim 1 wherein at least one initiating moiety is adapted to initiate a radical polymerisation reaction.

12. A process according to claim 11 wherein at least one initiating moiety is adapted to initiate an atom transfer radical polymerisation (ATRP) reaction.

13. A process according to claim 12 wherein the initiating moiety includes an alkyl halide moiety.

14. A process according to claim 13 wherein the alkyl halide moiety is selected from the group consisting of haloalkane, halo(alkyl)aryl, haloketone, haloester, haloamide and halonitrile.

15. A process according to claim 11 wherein at least one initiating moiety is adapted to initiate a reversible addition fragmentation chain transfer (RAFT) reaction.

16. A process according to claim 11 wherein at least one initiating moiety is adapted to initiate nitroxide-mediated polymerisation (NMP) reaction.

17. A process according to claim 1 wherein the substrate is removable from the cross-linked multilayer macromolecular film.

18. A process according to claim 1 further including the step of modifying the multilayer macromolecular film by reacting at least one reactive functional group on a layer of the macromolecular film with a compound selected from the group consisting of antifouling agents, superhydrophobic agents, antimicrobials, chelating compounds, fluorescent compounds, antibodies, scavenging compounds, metals and physiologically active compounds.

* * * * *